(12) United States Patent
Matsuda et al.

(10) Patent No.: US 9,058,358 B2
(45) Date of Patent: Jun. 16, 2015

(54) MERGING APPARATUS AND MERGING METHOD

(75) Inventors: Satoshi Matsuda, Kawasaki (JP); Kenichi Shimazaki, Kawasaki (JP); Kazunao Muramoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 737 days.

(21) Appl. No.: 13/240,316

(22) Filed: Sep. 22, 2011

(65) Prior Publication Data

US 2012/0016837 A1 Jan. 19, 2012

Related U.S. Application Data

(63) Continuation of application No. PCT/JP2009/056741, filed on Mar. 31, 2009.

(51) Int. Cl.
*G06F 7/00* (2006.01)
*G06F 17/30* (2006.01)

(52) U.S. Cl.
CPC .... *G06F 17/30498* (2013.01); *G06F 17/30566* (2013.01)

(58) Field of Classification Search
USPC .................................. 707/999.102, 999.101
See application file for complete search history.

(56) References Cited

U.S. PATENT DOCUMENTS

| | | | |
|---|---|---|---|
| 7,289,982 B2 * | 10/2007 | Saito et al. ............................ | 1/1 |
| 7,644,077 B2 * | 1/2010 | Picker et al. ................... | 707/783 |
| 8,073,845 B2 * | 12/2011 | Homma et al. ................ | 707/723 |
| 8,099,424 B2 * | 1/2012 | Kenedy et al. ................. | 707/759 |
| 8,195,610 B1 * | 6/2012 | Traband et al. ............... | 707/638 |
| 8,412,712 B2 * | 4/2013 | Caceres ......................... | 707/740 |
| 8,682,913 B1 * | 3/2014 | Betz ............................... | 707/755 |
| 8,825,471 B2 * | 9/2014 | Betz et al. ......................... | 704/9 |
| 2002/0107843 A1 * | 8/2002 | Biebesheimer et al. .......... | 707/3 |
| 2003/0018658 A1 * | 1/2003 | Suermondt et al. ........... | 707/204 |
| 2005/0055369 A1 | 3/2005 | Gorelik et al. | |
| 2005/0223022 A1 | 10/2005 | Weissman et al. | |
| 2006/0129415 A1 | 6/2006 | Thukral et al. | |

(Continued)

FOREIGN PATENT DOCUMENTS

| | | |
|---|---|---|
| EP | 1708099 | 10/2006 |
| JP | 7-192053 | 7/1995 |

(Continued)

OTHER PUBLICATIONS

International Search Report, mailed Apr. 28, 2009, in International Application No. PCT/JP2009/056741 (6 pp.).

(Continued)

*Primary Examiner* — Hosain Alam
*Assistant Examiner* — Eliyah S Harper
(74) *Attorney, Agent, or Firm* — Staas & Halsey LLP

(57) ABSTRACT

A merging apparatus includes a first database in which a plurality of attributes including a key attribute that is set in advance as a key for merging is set and a second database in which one or a plurality of attributes excluding the key attribute is set. Furthermore, the merging apparatus checks an attribute that is set in the first database against an attribute that is set in the second database and extracts a common attribute that is set in common in both the first database and the second database. Then, the merging apparatus merges the first database with the second database by determining whether attribute values classified under the extracted common attribute match.

5 Claims, 20 Drawing Sheets

(56) References Cited

U.S. PATENT DOCUMENTS

| | | |
|---|---|---|
| 2006/0178954 A1 | 8/2006 | Thukral et al. |
| 2006/0195297 A1 | 8/2006 | Kubota et al. |
| 2008/0133491 A1* | 6/2008 | Iwao ............................ 707/4 |
| 2009/0157689 A1* | 6/2009 | Hotz ............................ 707/10 |
| 2010/0161602 A1* | 6/2010 | Caceres ...................... 707/736 |
| 2010/0161634 A1* | 6/2010 | Caceres ...................... 707/758 |
| 2010/0205227 A1 | 8/2010 | Weissman et al. |

FOREIGN PATENT DOCUMENTS

| | | |
|---|---|---|
| JP | 2000-122910 | 4/2000 |
| JP | 2004-78336 | 3/2004 |
| JP | 2006-236280 | 9/2006 |
| JP | 2007-531941 | 11/2007 |

OTHER PUBLICATIONS

Form PCT/ISA/237, mailed Apr. 28, 2009, in International Application No. PCT/JP2009/056741 (3 pp.).

Rahm, E. et al., *Data Cleaning: Problems and Current Approaches*, University of Leipzig, Germany, XP-002284896 (11 pp.).

Extended European Search Report, dated Mar. 24, 2015, in corresponding European Application No. 09842644.8 (9 pp.).

* cited by examiner

| TYPE NAME | ATTRIBUTE | ATTRIBUTE VALUE |
|---|---|---|
| SERVER | IP ADDRESS | 192.168.0.1 |
| | name | host-1 |
| | OS | Windows |
| SERVER | IP ADDRESS | 192.168.0.2 |
| | name | host-2 |
| | OS | Linux |
| SERVER | IP ADDRESS | 192.168.0.3 |
| | name | host-2 |
| | OS | Solaris |
| ... | ... | ... |

FIG.5A

| FCMDB DATA MANAGEMENT TABLE | | | | |
|---|---|---|---|---|
| GLOBAL ID | TYPE NAME | ATTRIBUTE | ATTRIBUTE VALUE | MDR IDENTIFICATION INFORMATION |
| GID1 | SERVER | IP ADDRESS | 192.168.0.1 | MDR1 |
| | | name | host-1 | MDR1 |
| | | OS | Windows | MDR1 |
| GID2 | SERVER | IP ADDRESS | 192.168.0.2 | MDR1 |
| | | name | host-2 | MDR1 |
| | | OS | Linux | MDR1 |
| GID3 | SERVER | IP ADDRESS | 192.168.0.3 | MDR1 |
| | | name | host-2 | MDR1 |
| | | OS | Solaris | MDR1 |
| ... | ... | ... | ... | ... |

FIG.5B

| FCMDB DATA MANAGEMENT TABLE | | | | |
|---|---|---|---|---|
| GLOBAL ID | TYPE NAME | ATTRIBUTE | ATTRIBUTE VALUE | MDR IDENTIFICATION INFORMATION |
| GID1 | SERVER | IP ADDRESS | 192.168.0.1 | MDR1 |
| | | name | host-1 | MDR1,MDR3 |
| | | OS | Windows | MDR1,MDR3 |
| | | SERIAL NUMBER | SN001 | MDR3 |
| GID2 | SERVER | IP ADDRESS | 192.168.0.2 | MDR1 |
| | | name | host-2 | MDR1 |
| | | OS | Linux | MDR1 |
| GID3 | SERVER | IP ADDRESS | 192.168.0.3 | MDR1 |
| | | name | host-2 | MDR1 |
| | | OS | Solaris | MDR1 |
| ... | ... | ... | ... | ... |

FIG.6

| TYPE INFORMATION MANAGEMENT TABLE ||||
|---|---|---|---|
| TYPE NAME | ATTRIBUTE | MAIN-MDR IDENTIFICATION INFORMATION | SUB-MDR IDENTIFICATION INFORMATION |
| SERVER | IP ADDRESS | MDR1,MDR2 | - |
|  | name | MDR1 | MDR3 |
|  | OS | MDR1 | MDR3 |
|  | HDD | MDR2 | - |
|  | SERIAL NUMBER | MDR2 | MDR3 |
| SOFTWARE | ... | ... | ... |

FIG.7A

| UNIQUENESS CALCULATING TABLE | | | |
|---|---|---|---|
| TYPE NAME | ATTRIBUTE | ATTRIBUTE VALUE | NUMBER OF DUPLICATIONS |
| SERVER | name | host-1 | 1 |
| | | host-2 | 2 |
| | OS | Windows | 1 |
| | | Linux | 1 |
| | | Solaris | 1 |

FIG.7B

| UNIQUENESS CALCULATING TABLE | | | |
|---|---|---|---|
| TYPE NAME | ATTRIBUTE | ATTRIBUTE VALUE | NUMBER OF DUPLICATIONS |
| SERVER | name | host-1 | 1 |
| | | host-2 | 2 |
| | | host-4 | 1 |
| | | host-5 | 1 |
| | | host-6 | 1 |
| | | host-7 | 1 |
| | | host-8 | 1 |
| | | host-9 | 1 |
| | | host-10 | 1 |
| | OS | Windows | 5 |
| | | Linux | 4 |
| | | Solaris | 1 |

FIG.7C

| UNIQUENESS CALCULATING TABLE |||||
|---|---|---|---|
| TYPE NAME | ATTRIBUTE | ATTRIBUTE VALUE | NUMBER OF DUPLICATIONS |
| SERVER | name | host-1 | 1 |
| | | host-2 | 2 |
| | | host-4 | 1 |
| | | host-5 | 1 |
| | | host-6 | 1 |
| | | host-7 | 1 |
| | | host-8 | 1 |
| | | host-9 | 1 |
| | | host-10 | 1 |
| | OS | Windows | 5 |
| | | Linux | 4 |
| | | Solaris | 1 |
| | SERIAL NUMBER | SN001 | 1 |
| | | SN002 | 1 |
| | | SN003 | 1 |
| | | SN004 | 1 |
| | | SN005 | 1 |
| | | SN006 | 1 |
| | | SN007 | 1 |
| | | SN008 | 1 |
| | | SN009 | 1 |
| | | SN010 | 1 |

FIG.8A

| THRESHOLD TABLE | | | |
|---|---|---|---|
| TYPE NAME | THRESHOLD OF UNIQUENESS | THRESHOLD OF NUMBER OF DATA | ALTERNATE KEY |
| SERVER | 0.8 | 10 | - |
| SOFTWARE | 0.9 | 20 | - |
| ... | ... | ... | ... |

FIG.8B

| THRESHOLD TABLE | | | |
|---|---|---|---|
| TYPE NAME | THRESHOLD OF UNIQUENESS | THRESHOLD OF NUMBER OF DATA | ALTERNATE KEY |
| SERVER | 0.8 | 10 | name |
| SOFTWARE | 0.9 | 20 | - |
| ... | ... | ... | ... |

FIG.9A

| SUB-MDR IDENTIFICATION INFORMATION ||||||
|---|---|---|---|---|---|
| SUB-MDR IDENTIFICATION INFORMATION | RECONCILIATION CANDIDATE | LOCAL ID | TYPE NAME | ATTRIBUTE | ATTRIBUTE VALUE |
| MDR3 | - | LID1 | SERVER | name | host-1 |
| | | | | OS | Windows |
| | | | | SERIAL NUMBER | SN001 |
| | - | LID2 | SERVER | name | host-2 |
| | | | | OS | Linux |
| | | | | SERIAL NUMBER | SN002 |
| | - | LID2 | SERVER | name | host-3 |
| | | | | OS | Solaris |
| | | | | SERIAL NUMBER | SN003 |

FIG.9B

| SUB-MDR IDENTIFICATION INFORMATION ||||||
|---|---|---|---|---|---|
| SUB-MDR IDENTIFICATION INFORMATION | RECONCILIATION CANDIDATE | LOCAL ID | TYPE NAME | ATTRIBUTE | ATTRIBUTE VALUE |
| MDR3 | GID1 | LID1 | SERVER | name | host-1 |
| | | | | OS | Windows |
| | | | | SERIAL NUMBER | SN001 |
| | - | LID2 | SERVER | name | host-2 |
| | | | | OS | Linux |
| | | | | SERIAL NUMBER | SN002 |
| | - | LID2 | SERVER | name | host-3 |
| | | | | OS | Solaris |
| | | | | SERIAL NUMBER | SN003 |

FIG.9C

| SUB-MDR IDENTIFICATION INFORMATION | | | | | |
|---|---|---|---|---|---|
| SUB-MDR IDENTIFICATION INFORMATION | RECONCILIATION CANDIDATE | LOCAL ID | TYPE NAME | ATTRIBUTE | ATTRIBUTE VALUE |
| MDR3 | GID1 | LID1 | SERVER | name | host-1 |
| | | | | OS | Windows |
| | | | | SERIAL NUMBER | SN001 |
| | GID2 | LID2 | SERVER | name | host-2 |
| | | | | OS | Linux |
| | | | | SERIAL NUMBER | SN002 |
| | GID3 | LID2 | SERVER | name | host-3 |
| | | | | OS | Solaris |
| | | | | SERIAL NUMBER | SN003 |

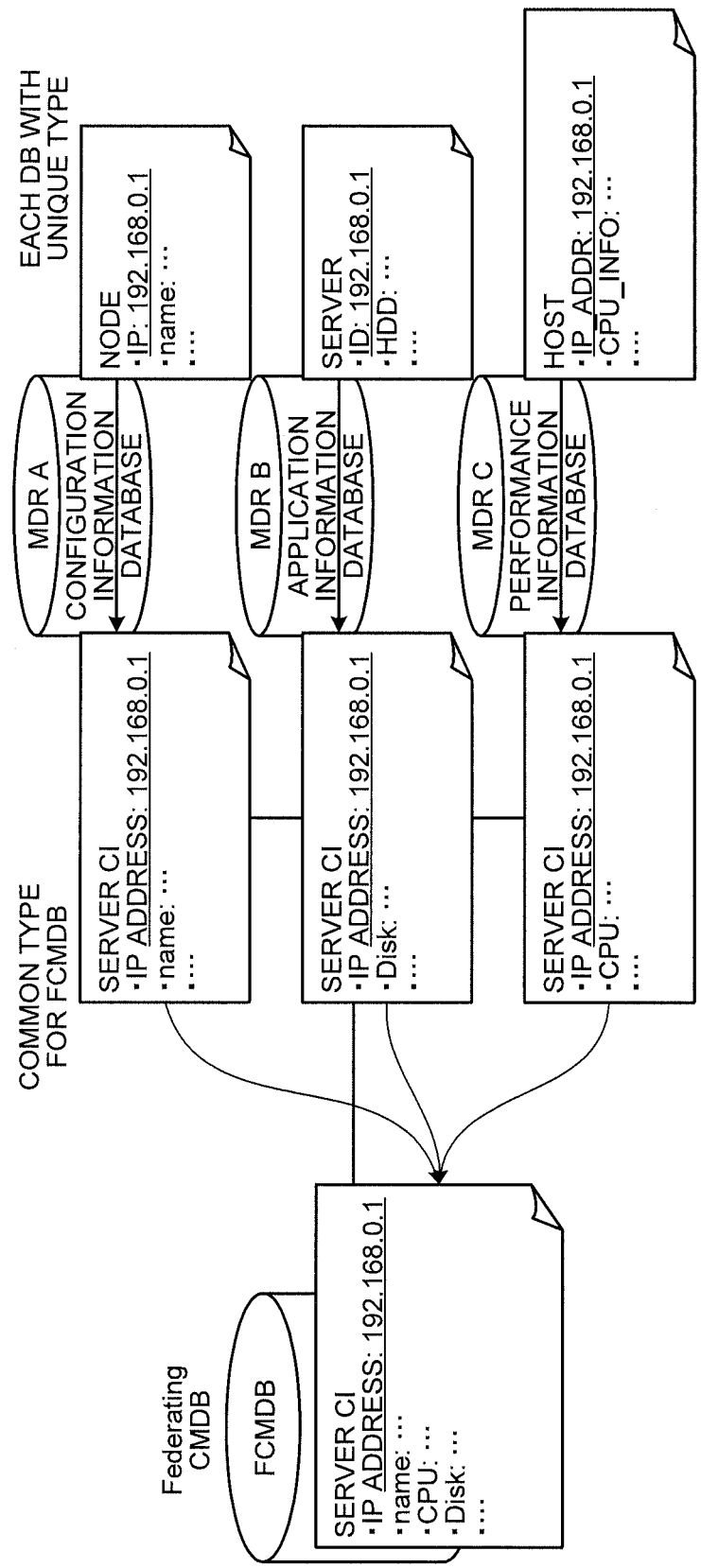

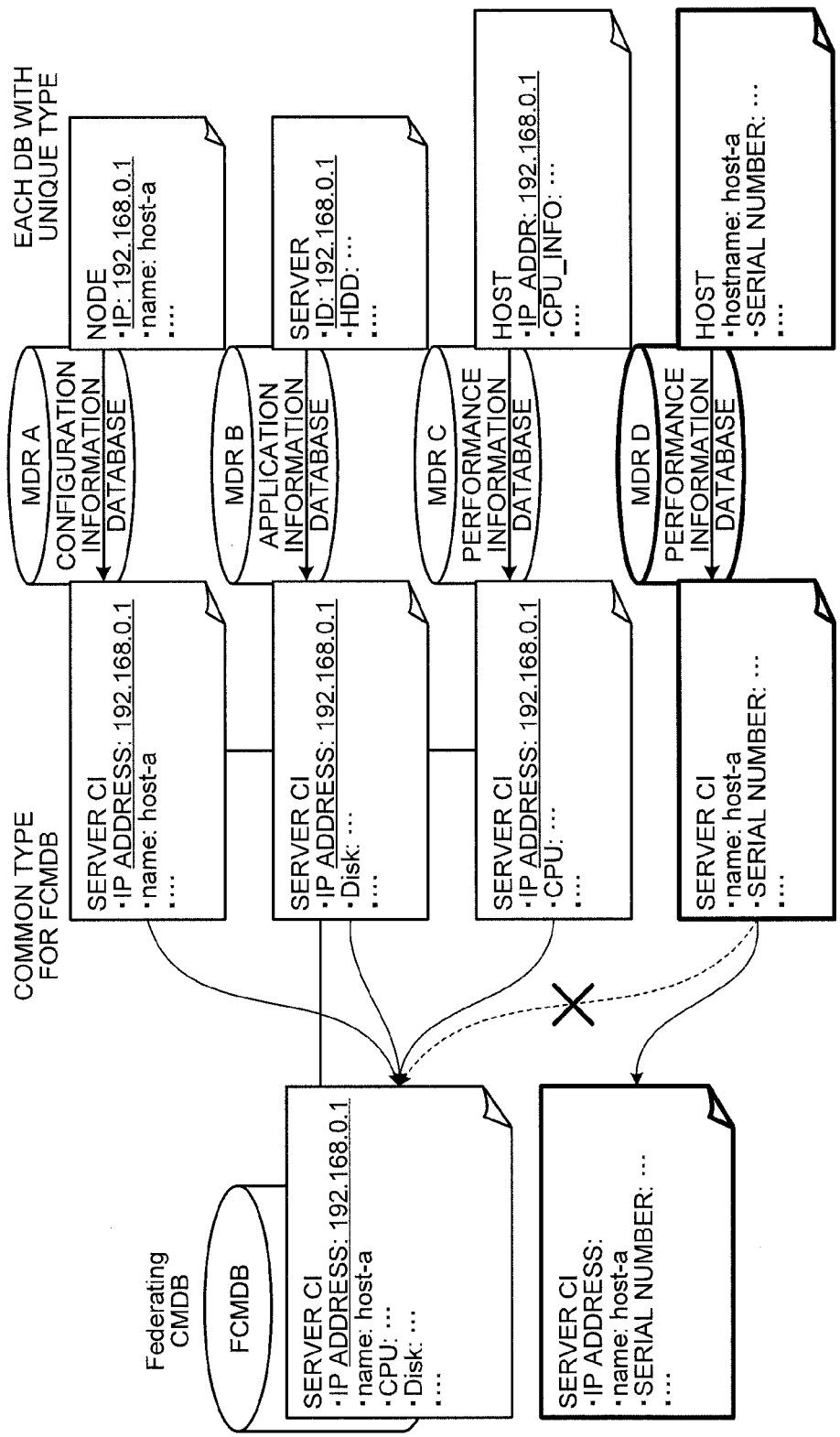

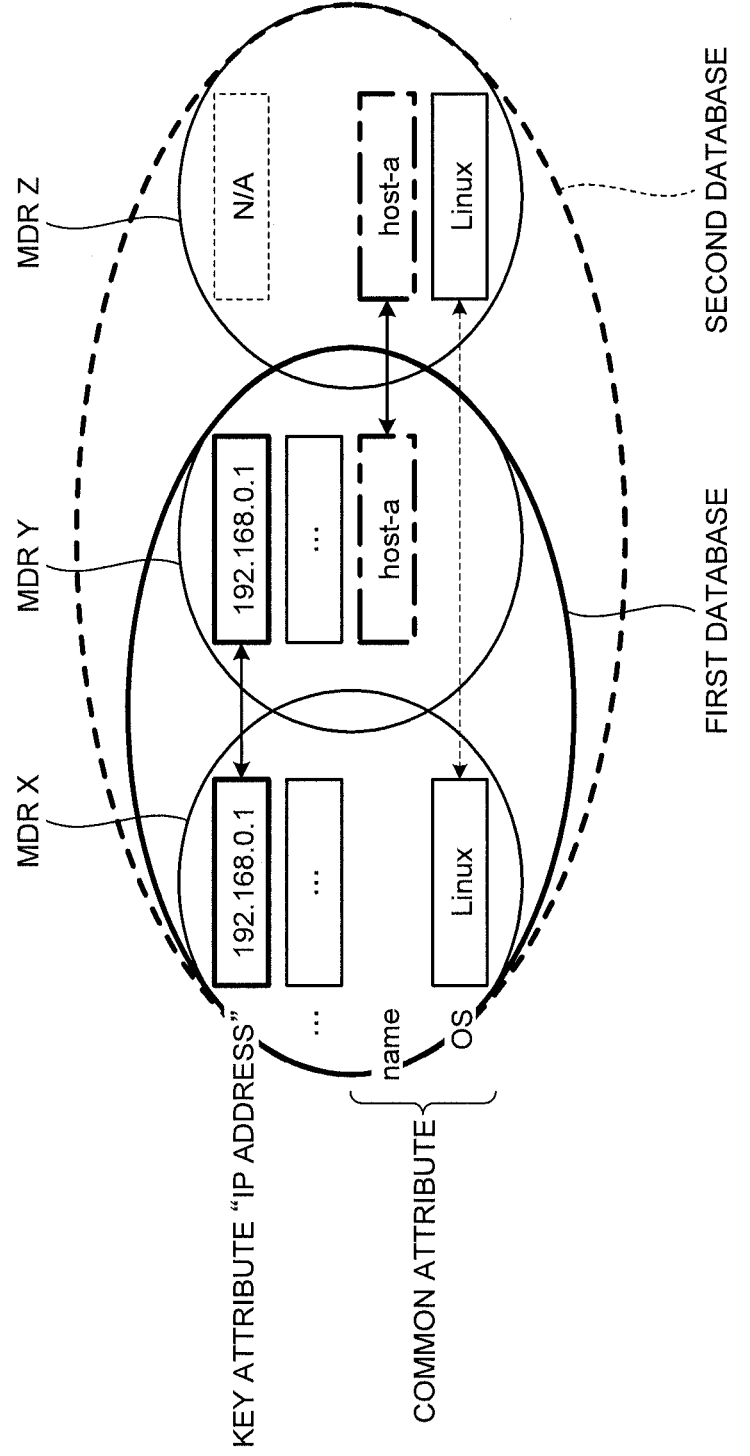

FIG.17

SUB-MDR INFORMATION MANAGEMENT TABLE

| SUB-MDR IDENTIFICATION INFORMATION | FIXED FLAG | RECONCILIATION CANDIDATE | LOCAL ID | TYPE NAME | ATTRIBUTE | ATTRIBUTE VALUE |
|---|---|---|---|---|---|---|
| MDR3 | true | GID1 | LID1 | SERVER | name | host-1 |
| | | | | | OS | Windows |
| | | | | | SERIAL NUMBER | SN001 |
| | true | GID2 | LID2 | SERVER | name | host-2 |
| | | | | | OS | Linux |
| | | | | | SERIAL NUMBER | SN002 |
| | false | GID3 | LID2 | SERVER | name | host-3 |
| | | | | | OS | Solaris |
| | | | | | SERIAL NUMBER | SN003 |

MERGING APPARATUS AND MERGING METHOD

CROSS-REFERENCE TO RELATED APPLICATION

This application is a continuation of International Application No. PCT/JP2009/056741, filed on Mar. 31, 2009, the entire contents of which are incorporated herein by reference.

FIELD

The embodiments discussed herein are directed to a merging apparatus, a merging method, and a merging program.

BACKGROUND

In recent years, there has been a known technology for managing a plurality of databases in a centralized manner, such as the federated configuration management database (federated CMDB), in which databases are virtually federated. For example, the federated CMDB centrally manages the location of data that is managed in existing databases in a distributed manner and provides a user with databases that are managed in a centralized manner.

Furthermore, in some cases, candidate databases for centralized management each store therein the same data; therefore, for example, the federated CMDB merges (also called matching or reconciliation) the same data stored in these candidate databases.

With a conventional federated CMDB, an administrator sets, in advance, a key attribute (called a reconcile key) functioning as a key for a merging process and merging is performed using the key attribute. Specifically, with the assumption that the key attribute is set in the database to be centrally managed, the federated CMDB merges data by determining whether the value of the key attribute matches data that is stored in a newly added database. For example, if the attribute "Internet Protocol (IP) address" is set in advance as the key attribute, the federated CMDB determines data having the same "IP address" value to be the same data and federates the determined data that is determined to be the same.

Of course, there is a database in which a key attribute is not set therein. When merging such a database, the federated CMDB merges data by, for example, by a user manually determining whether the data is the same. Furthermore, for example, after a user resets the key attribute, the federated CMDB re-merges all of the databases by using a key attribute that has been reset. Technologies for a system are disclosed in which multiple databases are federated regardless of database products or types.

Patent Document 1: Japanese National Publication of International Patent Application No. 2007-531941
Patent Document 2: Japanese Laid-open Patent Publication No. 2000-122910

However, with the conventional merging method, there is a problem in that merging cannot be easily performed. Specifically, data without using a key attribute cannot be easily merged. In such a case, a user has to determine the identical data, which is a burden for the user. Furthermore, for example, a user has to reset the key attribute, which is also a burden for the user. Furthermore, merging is performed again using a key of the key attribute that has been reset.

SUMMARY

According to an aspect of an embodiment of the invention, a merging apparatus that merges databases that store therein, as records, each of attribute values that is classified under one or a plurality of attributes and is associated with each other, the merging apparatus includes a first database in which a plurality of attributes including a key attribute that is set in advance as a key for merging is set; a second database in which one or a plurality of attributes excluding the key attribute is set; an extracting unit that checks the attribute that is set in the first database against the attribute that is set in the second database and extracts a common attribute that is set, in common, in both the first database and the second database; and a merging unit that merges the first database with the second database by determining whether attribute values classified under the common attribute that is extracted by the extracting unit match.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5A is a schematic diagram illustrating an example of information stored in an FCMDB data management table according to the first embodiment;

FIG. 5B is a schematic diagram illustrating an example of information stored in the FCMDB data management table according to the first embodiment;

FIG. 6 is a schematic diagram illustrating an example of information stored in a type information management table according to the first embodiment;

FIG. 7A is a schematic diagram illustrating an example of information stored in a uniqueness calculating table according to the first embodiment;

FIG. 7B is a schematic diagram illustrating an example of information stored in the uniqueness calculating table according to the first embodiment;

FIG. 7C is a schematic diagram illustrating an example of information stored in the uniqueness calculating table according to the first embodiment;

FIG. 8A is a schematic diagram illustrating an example of information stored in a threshold table according to the first embodiment;

FIG. 8B is a schematic diagram illustrating an example of information stored in the threshold table according to the first embodiment;

FIG. 9A is a schematic diagram illustrating an example of information stored in a sub-MDR information management table according to the first embodiment;

FIG. 9B is a schematic diagram illustrating an example of information stored in the sub-MDR information management table according to the first embodiment;

FIG. 9C is a schematic diagram illustrating an example of information stored in the sub-MDR information management table according to the first embodiment;

FIG. 10 is a schematic diagram illustrating a merging process that uses a key attribute and is performed by a registration processing unit according to the first embodiment;

FIG. 11 is a schematic diagram illustrating a database that is not merged by the merging process that uses the key attribute and is performed by the registration processing unit according to the first embodiment;

FIG. 12 is a schematic diagram illustrating a merging unit according to the first embodiment;

FIG. 17 is a schematic diagram illustrating an example of information stored in a sub-MDR information management table according to a second embodiment;

DESCRIPTION OF EMBODIMENTS

Preferred embodiments of the present invention will be explained with reference to accompanying drawings.

[a] First Embodiment

Outline of the Merging Apparatus

Figure 1:
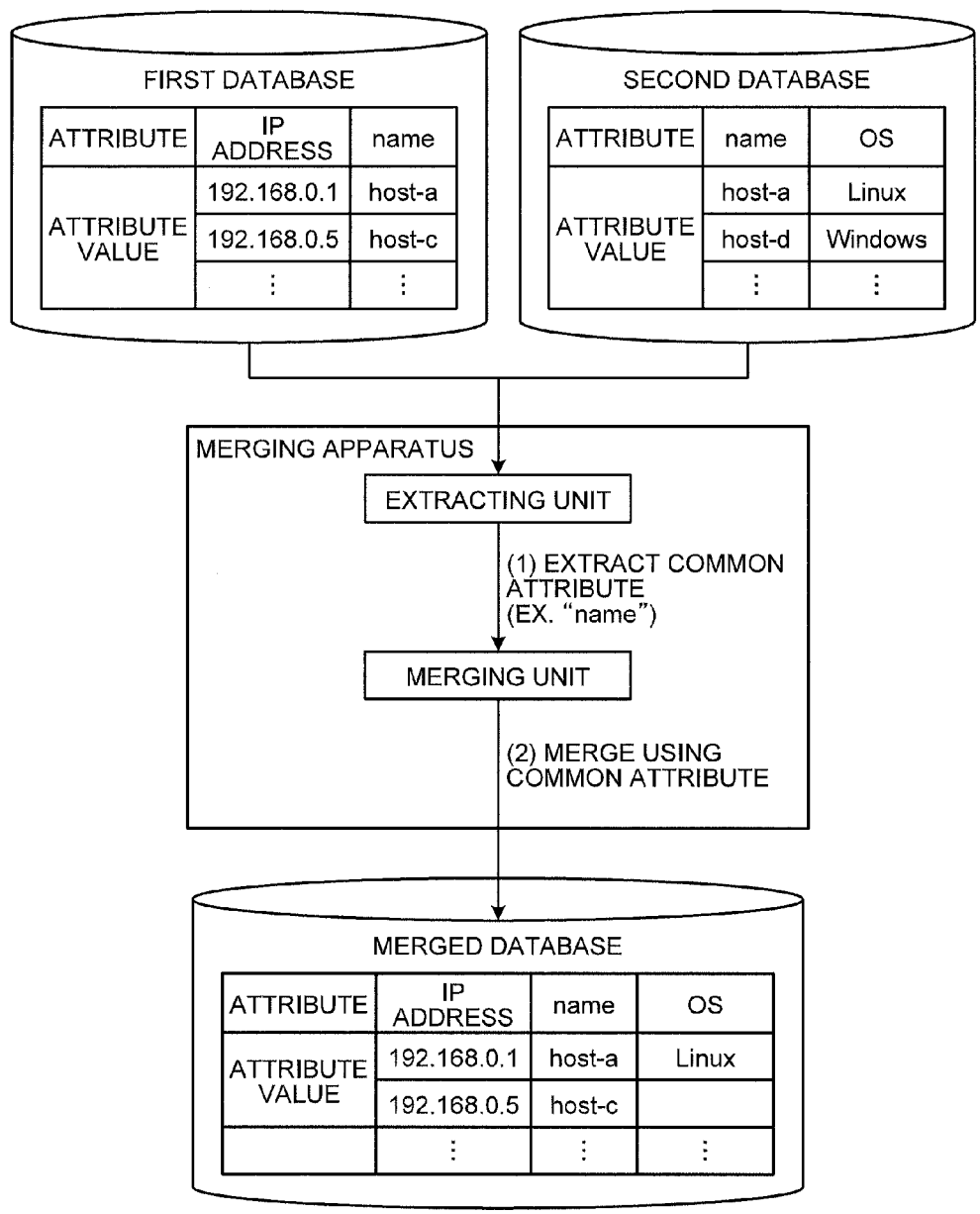
FIG. 1 is a schematic diagram illustrating the outline of a merging apparatus according to a first embodiment.

First, the outline of a merging apparatus according to the first embodiment will be described with reference to FIG. 1. FIG. 1 is a schematic diagram illustrating the outline of a merging apparatus according to a first embodiment.

The merging apparatus according to the first embodiment merges databases that store therein, as records, each of attribute values that is classified under one or a plurality of attributes and is associated with each other. In the merging apparatus, a key attribute functioning as a key for a merging process is set in advance. When merging databases in which the key attribute is set, the merging is performed using the key attribute.

As will be described below, the merging apparatus according to the first embodiment also merges databases in which the key attribute is not set. Specifically, the merging apparatus merges a first database, in which a plurality of attributes including the key attribute that is previously set as a key for the merging is set, with a second database, in which one or a plurality of attributes other than the key attribute is set. In the following, a case will be described in which the key attribute is an "IP address" unless otherwise noted.

Specifically, in the example illustrated in FIG. 1, the first database, in which the attribute "IP address" functioning as the key attribute and the attribute "name" are set, is merged with the second database, in which the attribute "IP address" is not set but the attributes "name" and "OS" are set. More specifically, as will be described below, from among the records stored in the first database and the second database, the same records are federated. In the example of "the first database" illustrated in FIG. 1, the record mentioned here means the IP address "192.168.0.1" associated with the name "host-a" or the IP address "192.168.0.5" associated with the name "host-c".

Specifically, with the merging apparatus according to the first embodiment, an extracting unit checks the attribute that is set in the first database against the attribute that is set in the second database. As illustrated in (1) of FIG. 1, the extracting unit extracts a common attribute that is set in common in both the first database and the second database. In the example illustrated in FIG. 1, the extracting unit extracts the common attribute "name".

Then, as illustrated in (2) of FIG. 1, the merging unit in the merging apparatus according to the first embodiment merges, for example, using the common attribute "name", the first database with the second database by determining whether attribute values that are classified in the extracted common attribute match. In other words, the merging unit expansively merges databases, which previously it had not been able to merge, by using the common attribute as an alternate key that is an alternative to a key attribute.

Consequently, for example, as illustrated in the "merged database" in FIG. 1, from among the records stored in the first database and the second database, the merging unit merges the records in which the attribute value of the common attribute is "host-a" and federates them as a single record.

By doing so, the merging apparatus according to the first embodiment easily merges a database that does not have a key attribute.

Configuration of the Merging Apparatus

Figure 2:
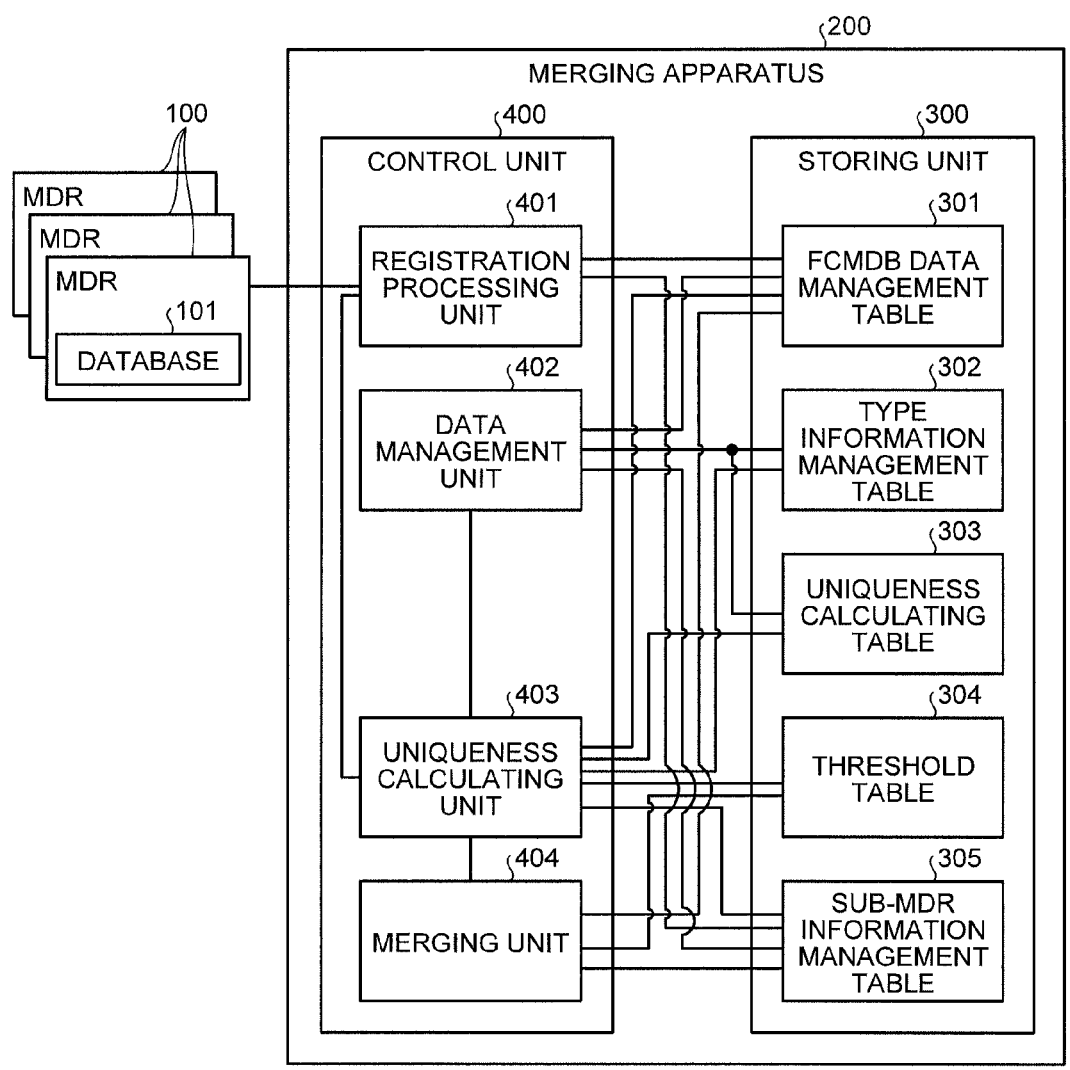
FIG. 2 is a block diagram illustrating the configuration of the merging apparatus according to the first embodiment.

In the following, the configuration of a merging apparatus 200 illustrated in FIG. 1 will be described with reference to FIG. 2. FIG. 2 is a block diagram illustrating the configuration of the merging apparatus according to the first embodiment. As illustrated in FIG. 2, the merging apparatus 200 is connected to a plurality of MDRs(Management Data Repositories) 100 and includes a storing unit 300 and a control unit 400.

Figures 3, 4:
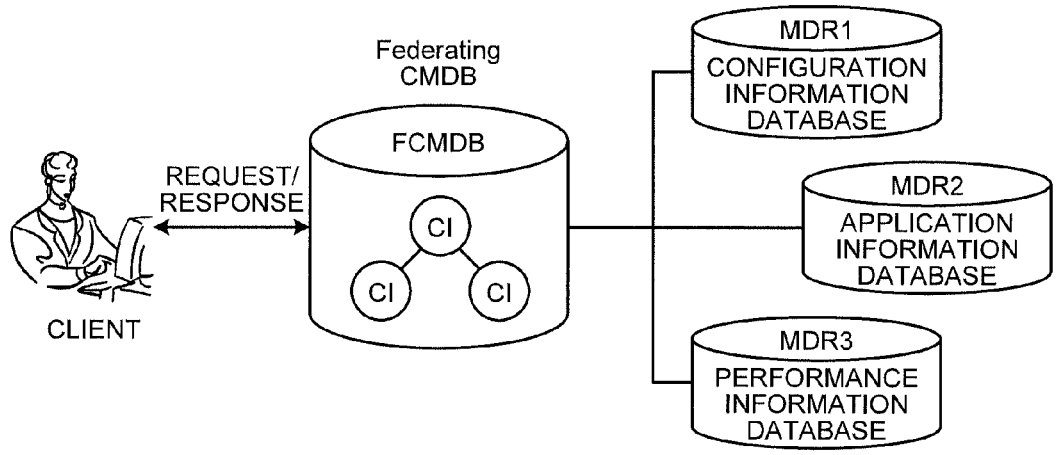
FIG. 3 is a schematic diagram illustrating an example of information stored in a database according to the first embodiment.
FIG. 4 is a schematic diagram illustrating the relation between the merging apparatus and MDRs according to the first embodiment.

As illustrated in FIG. 2, each of the MDRs 100 is connected to the merging apparatus 200 and includes a database 101. As illustrated in FIG. 3, one or a plurality of attributes is set in the database 101 in which each of the attribute values that is classified into the set attribute and is associated with each other is stored as a record. In the following, each of the MDRs 100 is simply referred to as an "MDR1", an "MDR2", and an "MDR3" unless otherwise noted.

In the example illustrated in FIG. 3, in the database 101, the attribute "IP address", the attribute "name", and the attribute "OS" are set as attributes that constitute a record. Furthermore, in the example illustrated in FIG. 3, the database 101 stores therein, in an associated manner as a record, the association of the IP address "192.168.0.1", the name "host-1", and the OS "Windows (registered trademark)" or, in an associated manner as a record, the IP address "192.168.0.2", the name "host-2", and the OS "Linux". FIG. 3 is a schematic diagram illustrating an example of information stored in a database according to the first embodiment.

The database 101 is the existing database to which data is previously input by an administrator that manages the database 101.

In FIG. 3, a case will be described as an example, in which the database 101 further uses a "type name" in addition to the "attribute". Here, the "type name" is information for identifying the type of the attribute. In the example illustrated in FIG. 3, the type name corresponds to a "server". For example, the type name "server" indicates that the attribute to be associated is the attribute related to "server". In the following, a case will be described in which the "type name" is included in a record; however, the present invention is not limited thereto. The "type name" is not necessarily included in a record.

Furthermore, each of the databases 101 is either the first database in which a plurality of attributes including a key attribute that is previously set as a key for merging is set or the second database in which one or a plurality of attributes other than the key attribute is set. For example, in the example illustrated in FIG. 3, the database 101 is the first database in which the "IP address", the "name", and the "OS" are set as the attribute and in which a plurality of attributes including a key attribute that is previously set as a key for merging is set.

The MDR 100 obtains the record stored in the database 101 and transmits, to the merging apparatus 200, the record stored in the database 101 and a registration request that requests the registration of the transmitted record when, for example, the MDR 100 is connected to the merging apparatus 200. As will be described later, each of the records transmitted from the MDR 100 to the merging apparatus 200 is merged, by the merging apparatus 200, with a record stored in the database 101 included in the MDR 100. Specifically, the database 101 in the MDR 100 is merged, by the merging apparatus 200, any of the other databases 101 in the corresponding MDR 100.

In the following, unless otherwise noted, a description will be given of a case in which the "MDR1" and the "MDR2" includes the first database and the "MDR3" includes the second database. Furthermore, in the following, unless otherwise noted, the MDR 100 that includes the first database is denoted by the "main-MDR" and the MDR 100 that includes the second database is denoted by the "sub-MDR". In other words, the MDR1 and the MDR2 are the "main-MDR" and the MDR3 is the "sub-MDR".

In the following, the relation between the merging apparatus 200 and the MDR 100 will be described with reference to FIG. 4. FIG. 4 is a schematic diagram illustrating the relation between the merging apparatus and MDRs according to the first embodiment. The "federating CMDB" illustrated in FIG. 4 corresponds to the merging apparatus 200 according to the first embodiment.

As illustrated in FIG. 4, each of the MDRs 100 includes a database. In the example illustrated in FIG. 4, the "MDR1" includes a database related to configuration information, the "MDR2" includes a database related to application information, and the "MDR3" includes a database related to performance information.

As illustrated in FIG. 4, the merging apparatus 200 is connected to each of the MDRs 100 and centrally manages the records stored in each of the databases 101. Specifically, the merging apparatus 200 centrally manages the records such that which database 101 stores therein which record. Furthermore, the merging apparatus 200 centrally receives, from a client, an access request for each database and responds, to the client, with a record corresponding to the received request.

By referring back to FIG. 2, the storing unit 300 in the merging apparatus 200 will be described. The storing unit 300 is connected to the control unit 400 and stores therein data used for various merging processes performed by the control unit 400. Furthermore, the storing unit 300 includes an FCMDB data management table 301, a type information management table 302, a uniqueness calculating table 303, a threshold table 304, and a sub-MDR information management table 305.

The FCMDB data management table 301 is connected to a registration processing unit 401, a data management unit 402, a uniqueness calculating unit 403, and a merging unit 404, which will be described later. As illustrated in FIGS. 5A and 5B, the FCMDB data management table 301 stores therein each of the records transmitted to the merging apparatus 200 by the MDR 100. In other words, the FCMDB data management table 301 stores therein each of the records stored in each of the databases 101. FIGS. 5A and 5B are schematic diagrams each illustrating an example of information stored in an FCMDB data management table according to the first embodiment.

As illustrated in FIGS. 5A and 5B, in addition to the "type name", the "attribute", and the "attribute value" that are stored in the database 101 described by FIG. 3, the FCMDB data management table 301 further stores therein the "global ID" and the "MDR identification information" in an associated manner. In the example illustrated in FIG. 5A, the FCMDB data management table 301 stores therein, in an associated manner as a record, the global ID "GID1", the type name "server", the IP address "192.168.0.1", the name "host-1", the OS "Windows", and the MDR identification information "MDR1".

The "global ID" is information for uniquely identifying each record stored in the FCMDB data management table 301. In the example illustrated in FIG. 5A, the "global ID" corresponds to the "GID1", the "GID2", and the like. The "MDR identification information" identifies which database 101 in the MDR 100 stores the associated record. In the example illustrated in FIG. 5A, the FCMDB data management table 301 stores therein the MDR identification information "MDR1". Furthermore, the MDR identification information "MDR1" identifies the "MDR1".

FIG. 5B illustrates an example of information stored in the FCMDB data management table 301 after the second database is merged by the merging unit 404, which will be described later. In FIG. 5B, a case is illustrated as an example in which a record containing the name "host-1", the OS "Windows", and the serial number "SN001" stored in the database 101 in the "MDR3" is merged with the record of the global ID "GID1" illustrated in FIG. 5A. Specifically, as can be seen from the global ID "GID1" illustrated in FIG. 5B, the FCMDB data management table 301 stores therein, in addition to the MDR identification information "MDR1", the MDR identification information "MDR3" by associating it with the name "host-1" and the OS "Windows". Furthermore, the FCMDB data management table 301 newly stores therein the serial number "SN001". The FCMDB data management table 301 stores therein the MDR identification information "MDR3" by associating it with the serial number "SN001".

In the FCMDB data management table 301, the record stored in the first database is stored by the registration processing unit 401. The record is stored every time, for example, a new MDR 100 is connected to the merging apparatus 200. For example, the FCMDB data management table 301 stores therein all the pieces of information illustrated in FIG. 5A.

Furthermore, in the FCMDB data management table 301, the records stored in the second database are stored by the merging unit 404. In the example illustrated in FIG. 5B, the "MDR3" is stored in the appropriate location. The information stored in the FCMDB data management table 301 is used by the data management unit 402 or the merging unit 404.

As will be described later, from among the information stored in the FCMDB data management table 301, the sub-MDR information is deleted by the uniqueness calculating unit 403 every time a new alternate key is set, and then the sub-MDR information that is merged using a new alternate key is stored. The alternate key will be described in detail later; therefore, a description thereof is omitted here.

The type information management table 302 is connected to the data management unit 402 and the uniqueness calculating unit 403 that will be described later. Furthermore, the type information management table 302 stores therein, by associating with an attribute, information that identifies the database 101 in which the attribute is set.

For example, as illustrated in FIG. 6, by associating with the "type name" and the "attribute", the type information management table 302 stores therein "main-MDR identification information" that identifies the main-MDR and "sub-MDR identification information" that identifies the sub-MDR in which the associated attribute is set. FIG. 6 is a schematic diagram illustrating an example of information stored in a type information management table according to the first embodiment.

In the example illustrated in FIG. 6, the type information management table 302 stores therein the main-MDR identification information "MDR1" and the sub-MDR identification information "MDR3" in such a manner that they are associated with the type name "server" and the attribute "name". Specifically, the type information management table 302 stores therein information indicating that the type name "server" and the attribute "name" are set in the database 101 in the "MDR1" functioning as the main-MDR and the database 101 in the "MDR3" functioning as the sub-MDR.

In the type information management table 302, information is stored by the data management unit 402. For example, in the type information management table 302, information is stored by the data management unit 402 every time a new MDR 100 is connected to the merging apparatus 200 and a new record is stored in the FCMDB data management table 301. Furthermore, as will be described later, in the type information management table 302, information is stored by the data management unit 402 every time a new record is stored in the sub-MDR information management table 305. The information stored in the type information management table 302 is used by the uniqueness calculating unit 403.

FIG. 6 illustrates an example of information stored in the type information management table 302 when the information on the "MDR1", the "MDR2", and the "MDR3" is stored.

The uniqueness calculating table 303 is connected to the data management unit 402 and the uniqueness calculating unit 403 that will be described later. Furthermore, the uniqueness calculating table 303 stores therein, for each attribute, the number of duplications for each attribute value classified under the attribute. Specifically, the uniqueness calculating table 303 stores therein the number of duplications for the attribute values. For example, as illustrated in FIGS. 7A to 7C, the uniqueness calculating table 303 stores therein "the number of duplication" such that it is associated with the "type name", the "attribute", and the "attribute value".

FIGS. 7A to 7C are schematic diagrams each illustrating an example of information stored in the uniqueness calculating table according to the first embodiment. The number of duplication indicates the number of records containing the same attribute value from among the records stored in the FCMDB data management table 301.

In the example illustrated in FIG. 7A, the uniqueness calculating table 303 stores therein the number of duplication "1" by associating it with the type name "server", the attribute "name", and the attribute value "host-1". Specifically, the uniqueness calculating table 303 stores therein information indicating a single record containing the attribute value "host-1", which is classified under the type name "server" and under the attribute "name", is stored in the FCMDB data management table 301.

Furthermore, in the uniqueness calculating table 303, information is stored by the data management unit 402 every time, for example, a new MDR 100 is connected to the merging apparatus 200 and a new record is stored in the FCMDB data management table 301. Furthermore, the information stored by the uniqueness calculating table 303 is used by the uniqueness calculating unit 403.

FIG. 7A illustrates an example of information stored in the uniqueness calculating table 303 by the data management unit 402 before the completion of the storing of the information on the "MDR1" after the data management unit 402 starts the storing. FIG. 7B illustrates an example of information stored in the uniqueness calculating table 303 when the data management unit 402 stores all of the information on the "MDR1". FIG. 7C illustrates an example of information stored in the uniqueness calculating table 303 when the data management unit 402 stores all of the information on the "MDR2" after storing the information on the "MDR1".

The threshold table 304 is connected to the uniqueness calculating unit 403 and the merging unit 404 and stores therein a threshold that is used for the calculation performed by the uniqueness calculating unit 403. For example, as illustrated in FIGS. 8A and 8B, the threshold table 304 stores therein, for each type name, the "threshold of the uniqueness", the "threshold of the number of data", and the "alternate key" in an associated manner. FIGS. 8A and 8B are schematic diagrams each illustrating an example of information stored in a threshold table according to the first embodiment.

In the example illustrated in FIG. 8B, the threshold table 304 stores therein the threshold of the uniqueness "0.8" and the threshold of the number of data "10" by associating them with the type name "server" and further stores therein the alternate key "name".

For a record stored in a database that does not contain the key attribute, the alternate key mentioned here means a merge key that is used to expansively merge databases that is not merged using the key attribute while maintaining the merge result obtained using the key attribute if the merge result is present. The alternate key is set by the uniqueness calculating unit 403. Setting of the alternate key will be described in detail later; therefore, a description thereof is omitted here.

The "threshold of the uniqueness" is the uniqueness threshold, which will be described later, and indicates the minimum uniqueness allowable by an administrator. Furthermore, the "threshold of the uniqueness" is used by the uniqueness calculating unit 403 and is set by, for example, an administrator. In the example illustrated in FIG. 8A, the threshold table 304 stores therein information indicating that the threshold of the uniqueness associated with the type name "server" is "0.8".

As will be described later, the uniqueness mentioned here means a value calculated by the uniqueness calculating unit 403 for each attribute and indicates that there may possibly be another record containing the same attribute value. The higher the degree of uniqueness in the attribute, the lower the possibility of another record containing the same attribute value existing. In contrast, the lower the degree of uniqueness in the attribute, the higher the possibility of another record containing the same attribute value existing.

The "threshold of the number of data" indicates the minimum value of the number of data that is used when the uniqueness is calculated by the uniqueness calculating unit 403, which will be described later. For example, in the example illustrated in FIG. 8A, the threshold table 304 stores therein information indicating that the threshold of the number of data associated with the type name "server" is "10".

Furthermore, in the threshold table 304, the "threshold of the uniqueness" and the "threshold of the number of data" are previously stored by an administrator, and, as will be described later, the "alternate key" is input by the uniqueness calculating unit 403. From among the information stored in the threshold table 304, the "type name", the "threshold of the uniqueness", and the "threshold of the number of data" are used by the uniqueness calculating unit 403 and the "alternate key" is used by the merging unit 404.

FIG. 8A illustrates an example of information stored in the threshold table 304 before the uniqueness calculating unit 403 sets the alternate key. FIG. 8B illustrates an example of information stored in the threshold table 304 after the uniqueness calculating unit 403 sets the alternate key.

The sub-MDR information management table 305 is connected to the registration processing unit 401, the data management unit 402, the uniqueness calculating unit 403, and the merging unit 404 and stores therein information on the record stored in the second database. Specifically, the sub-MDR information management table 305 stores therein information on the record to be merged using the common attribute.

For example, as illustrated in FIGS. 9A, 9B and 9C, in a similar manner as with the database 101 described using FIG. 3, the sub-MDR information management table 305 stores therein the "type name", the "attribute", and the "attribute value". Furthermore, the sub-MDR information management table 305 further stores therein the "sub-MDR identification information", a "reconciliation candidate" and a "local ID" in an associated manner. FIGS. 9A, 9B and 9C are schematic diagrams each illustrating an example of information stored in the sub-MDR information management table according to the first embodiment.

In the example illustrated in FIG. 9A, the sub-MDR information management table 305 stores therein information on the record stored in the sub-MDR identification information "MDR3". For example, the sub-MDR information management table 305 stores therein the record containing the reconciliation candidate "-", the local ID "LID1", the type name "server", the name "host-1", the OS "Windows", and the serial number "SN001".

The "local ID" is information for identifying a record in the database 101 and is contained in, for example, the information transmitted from the MDR 100 to the merging apparatus 200.

The "reconciliation candidate" indicates the merge result of the merging performed using the alternate key. For example, as illustrated in FIG. 9B, the sub-MDR information management table 305 stores therein the global ID for the record that has already been merged with the record in the main-MDR and stores therein "-" for the record that is not merged. In the example illustrated in FIG. 9B, the sub-MDR information management table 305 stores therein the reconciliation candidate "GID1" by associating it with the local ID "LID1" and also stores therein the reconciliation candidate "-" by associating it with the local ID "LID2". Specifically, the sub-MDR information management table 305 stores therein information indicating that the record identified by the "LID1" is merged with the record identified by the "GID1" and also stores therein information indicating that the record identified by the "LID2" is not merged.

Furthermore, in the sub-MDR information management table 305, information other than the "reconciliation candidate" is stored by the registration processing unit 401 every time, for example, a new sub-MDR is connected to the merging apparatus 200. Furthermore, in the sub-MDR information management table 305, the "reconciliation candidate" is stored by the merging unit 404. The information stored by the sub-MDR information management table 305 is used by the data management unit 402, the uniqueness calculating unit 403, and the merging unit 404.

Referring back to FIG. 2, the control unit 400 is connected to the storing unit 300, includes an internal memory for storing programs prescribing various kinds of procedures, and performs various kinds of merging. Furthermore, the control unit 400 includes the registration processing unit 401, the data management unit 402, the uniqueness calculating unit 403, and a merging unit 404.

The registration processing unit 401 is connected to each of the MDRs 100, and is also connected to the FCMDB data management table 301, the sub-MDR information management table 305, and the uniqueness calculating unit 403. Furthermore, in the registration processing unit 401, the key attribute, such as the attribute "IP address", is previously set by an administrator.

Furthermore, the registration processing unit 401 receives, each MDR 100, a record and a registration request that are stored in each database 101 in each MDR 100 when, for example, the MDR 100 is connected to the merging apparatus 200. Then, the registration processing unit 401 stores the received record in the FCMDB data management table 301 or the sub-MDR information management table 305.

Specifically, when receiving the record and the registration request from the MDR 100, the registration processing unit 401 determines whether the record is transmitted from the main-MDR or from the sub-MDR. Specifically, the registration processing unit 401 determines whether the key attribute, i.e., the attribute "IP address", is set in the database 101 in the MDR 100 that corresponds to the transmission source. Then, if the registration processing unit 401 determines that the record is from the main-MDR, the registration processing unit 401 stores the record in the FCMDB data management table 301. If the registration processing unit 401 determines that the record is from the sub-MDR, it stores the record in the sub-MDR information management table 305.

For example, the registration processing unit 401 determines whether the received record contains a record containing an attribute value classified under the key attribute, for example, a record containing an attribute value classified into the attribute "IP address". Then, if the registration processing unit 401 determines that the record contains the attribute value classified under the attribute "IP address", the registration processing unit 401 stores the record in the FCMDB data management table 301. In contrast, if the registration processing unit 401 determines that the record does not contain the attribute value classified under the attribute "IP address", it stores the record in the sub-MDR information management table 305.

A case in which the registration processing unit 401 receives a record from the main-MDR will be described with reference to FIG. 10. FIG. 10 is a schematic diagram illustrating a merging process that uses a key attribute and is performed by a registration processing unit according to the first embodiment. The "FCMDB" in FIG. 10 corresponds to the FCMDB data management table 301 in the merging apparatus 200 illustrated in FIG. 2.

As illustrated in FIG. 10, when receiving a record from the main-MDR, the registration processing unit 401 performs the merging using the key attribute and stores the record in the FCMDB data management table 301. FIG. 10 illustrates a case in which an attribute unique to each of the corresponding databases 101 is set in the databases 101 managed by the "MDR A" to "MDR C". In the example illustrated in FIG. 10, the attribute "IP" is set in the database 101 in the "MDR A", the attribute "ID" is set in the database 101 in the "MDR B", and the attribute "IP ADDR" is set in the database 101 in the "MDR C". Here, it is assumed that the attribute "IP", the attribute "ID", and the attribute "IP ADDR" each correspond to the attribute "IP address" and it is assumed that the "MDR A" to the "MDR C" are the main-MDR.

In the example illustrated in FIG. 10, when receiving the record stored in the database 101 in the MDR 100, the registration processing unit 401 changes the attribute that is set in the database 101 to the attribute of a common type for the FCMDB that is used by the merging apparatus 200. For example, the registration processing unit 401 changes the attribute "IP", the attribute "ID", and the attribute "IP ADDR" to the attribute "IP address". For example, the registration processing unit 401 changes the attribute by associating the attribute unique to each of the databases 101 with each of the attributes used by the merging apparatus 200 and by storing them in advance.

Furthermore, in the example illustrated in FIG. 10, because the key attribute is set in the "MDR A" to the "MDR C", the registration processing unit 401 determines that the key attribute is set and merges records stored in each of the databases 101 using the key attribute. For example, the registration processing unit 401 determines whether the attribute values classified under the attribute "IP address" match. If they match, the registration processing unit 401 merges records by recognizing them as the same record. Then, the registration processing unit 401 stores the matching record, as the same record, in the FCMDB data management table 301.

A merging process performed by the registration processing unit 401 using the key attribute will be described in detail later; therefore, a description thereof is omitted here.

A case in which the registration processing unit 401 receives a record from the sub-MDR will be described with reference to FIG. 11. FIG. 11 is a schematic diagram illustrating a database that is not merged by the merging process that uses the key attribute and is performed by the registration processing unit according to the first embodiment. The "FCMDB" illustrated in FIG. 11 corresponds to the FCMDB data management table 301 in the merging apparatus 200 illustrated in FIG. 2.

As illustrated in FIG. 11, when receiving a record stored in the database 101 in the "MDR D" that corresponds to the sub-MDR, the registration processing unit 401 changes the attribute that is set in the database 101 in the "MDR D" to the attribute of a common type for the FCMDB that is used by the merging apparatus 200.

Furthermore, in the example illustrated in FIG. 11, because the key attribute is not set in the "MDR D", the registration processing unit 401 determines that the key attribute is not set and stores the received record in the sub-MDR information management table 305 without processing anything. Specifically, as illustrated in FIG. 11, because the attribute "IP address" functioning as the key attribute is not set in the "MDR D", the registration processing unit 401 does not perform the merging using the attribute "IP address". Accordingly, the registration processing unit 401 stores the received record in the sub-MDR information management table 305 without processing the merging. As will be described later, the record stored in the sub-MDR information management table 305 is merged by the merging unit 404.

When the registration processing unit 401 determines that a record is from the sub-MDR and stores the record in the sub-MDR information management table 305, the registration processing unit 401 transmits, to the uniqueness calculating unit 403, information indicating that the record from the sub-MDR is stored.

Referring back to FIG. 2, the data management unit 402 is connected to the FCMDB data management table 301, the sub-MDR information management table 305, the type information management table 302, the uniqueness calculating table 303, and the uniqueness calculating unit 403.

By using the information stored in the FCMDB data management table 301 or the sub-MDR information management table 305, the data management unit 402 stores information in the type information management table 302 or the uniqueness calculating table 303. In the following, storing of information in the type information management table 302 will be described first, and then storing information in the uniqueness calculating table 303 will be described.

A case will be described in which the data management unit 402 stores information in the type information management table 302. The data management unit 402 obtains, from the FCMDB data management table 301, the "type name", the "attribute", and the "MDR identification information", all of which are associated with each other. Furthermore, the data management unit 402 obtains, from the sub-MDR information management table 305, the "type name", the "attribute", and the "sub-MDR identification information", all of which are associated with each other.

In the example illustrated in FIG. 5A, the data management unit 402 obtains, from the FCMDB data management table 301, the type name "server", the attributes "IP address", "name", and "OS", and the MDR identification information "MDR1", all of which are associated with each other. Furthermore, in the example illustrated in FIGS. 9A, 9B and 9C, the data management unit 402 obtains, from the sub-MDR information management table 305, the type name "server", the attributes "name", "OS", and "serial number", and the sub-MDR identification information "MDR3", all of which are associated with each other.

The data management unit 402 stores, in an associated manner in the type information management table 302, the "type name", the "attribute", and the "MDR identification information" or the "type name", the "attribute", and the "sub-MDR identification information" obtained from the FCMDB data management table 301 or the sub-MDR information management table 305.

A description is given of a case in which the type name "server", the attributes "IP address", "name", and "OS", and the MDR identification information "MDR1", which are associated with each other, are received from the FCMDB data management table 301. As illustrated in FIG. 6, the data management unit 402 stores, as the attribute associated with the type name "server", the attributes "IP address", "name", and "OS". Furthermore, the data management unit 402 stores the "MDR1" as the MDR identification information that is associated with the attribute "IP address", the attribute "name", the attribute "OS", and the like.

In the following, a case will be described in which the type name "server", the attributes "name", "OS", and "serial number", and the sub-MDR identification information "MDR3", which are associated with each other, are received from the sub-MDR information management table 305. As illustrated in FIG. 6, the data management unit 402 stores therein, as the attribute associated with the type name "server", the attributes "name", "OS", and "serial number". Furthermore, the data management unit 402 stores therein the "MDR3" as the sub-MDR identification information that is associated with the attributes "name", the attribute "OS", and the attribute "serial number".

A case will be described in which the data management unit 402 stores information in the uniqueness calculating table 303. The data management unit 402 obtains, from the FCMDB data management table 301, the "type name", the "attribute", and the "attribute value", which are associated with each other. In the example illustrated in FIG. 5A, the data management unit 402 obtains, the type name "server", the attribute "name", and the attribute value "host-1", which are associated with each other, or obtains the type name "server", the attribute "name", and the attribute value "host-2", which are associated with each other.

Furthermore, the data management unit 402 stores the obtained associated items in the uniqueness calculating table 303. Specifically, the data management unit 402 stores the obtained "type name", the "attribute", and the "attribute value", which are associated with each other. For example, the data management unit 402 stores the type name "server", the attribute "name", and the attribute value "host-1" in an associated manner or stores the type name "server", the attribute "name", and the attribute value "host-2" in an associated manner.

Furthermore, every time the data management unit 402 stores a newly obtained associated item in the uniqueness calculating table 303, the data management unit 402 sets "the number of duplications" that is associated with the stored "type name", the stored "attribute", and the stored "attribute value".

For example, when storing the "type name", the "attribute", and the "attribute value" that are not stored in the uniqueness calculating table 303, the data management unit 402 sets "1" as the number of the duplications. Then, if the obtained associated item is stored in the uniqueness calculating table 303, the data management unit 402 sets a value to which "1" is added to a value of the "the number of the duplications" that has already been associated with the obtained associated item and that has already been stored in the uniqueness calculating table 303. Specifically, if the number of duplications is "1", "2" is set as the number of duplications.

The data management unit 402 constantly monitors, for example, the FCMDB data management table 301 and the sub-MDR information management table 305. Then, the data management unit 402 obtains information every time, for example, a new MDR 100 is connected to the merging apparatus 200 and a new record is stored in the FCMDB data management table 301 or the sub-MDR information management table 305 by the registration processing unit 401. Thereafter, the data management unit 402 stores the obtained information in the type information management table 302 or the uniqueness calculating table 303. Specifically, the data management unit 402 updates information stored in the type information management table 302 or in the uniqueness calculating table 303 every time the information stored in the FCMDB data management table 301 or the sub-MDR information management table 305 changes.

The flow of a process performed by the data management unit 402 will be described in detail later; therefore, a description thereof is omitted here.

Every time the data management unit 402 updates the type information management table 302 or the uniqueness calculating table 303, the data management unit 402 transmits information on completion of the update to the uniqueness calculating unit 403.

The uniqueness calculating unit 403 is connected to the FCMDB data management table 301, the type information management table 302, the uniqueness calculating table 303, the threshold table 304, the sub-MDR information management table 305, the registration processing unit 401, the data management unit 402, and the merging unit 404. The uniqueness calculating unit 403 is also called an extracting unit or a calculating unit. As will be described below, the uniqueness calculating unit 403 extracts the common attribute, calculates the uniqueness, and sets it as the alternate key. In the following, a description of extracting the common attribute, calculating the uniqueness, and setting the alternate key will be given in the order they are listed in this sentence.

The uniqueness calculating unit 403 performs a process, which will be described below, every time the uniqueness calculating unit 403 receives information indicating that a record for the sub-MDR is received from the registration processing unit 401 or receives information on completion of the update from the data management unit 402.

A case in which the uniqueness calculating unit 403 extracts the common attribute will be described. The uniqueness calculating unit 403 checks the attribute that is set in the first database against the attribute that is set in the second database and extracts the common attribute that is set, in common, in the first database and the second database. For example, by referring to the type information management table 302, from among the attributes stored in the type information management table 302, the uniqueness calculating unit 403 extracts the attribute in which the MDR identification information is stored in both the "main-MDR identification information" and the "sub-MDR identification information".

In the example illustrated in FIG. 6, the uniqueness calculating unit 403 extracts, as the common attribute, the attribute "name" and the "OS" that correspond to the attribute common to the main-MDR identification information "MDR1" and the sub-MDR identification information "MDR3". Furthermore, the uniqueness calculating unit 403 extracts the attribute "serial number" that corresponds to the attribute common for the main-MDR identification information "MDR2" and the sub-MDR identification information "MDR3".

A case in which the uniqueness calculating unit 403 calculates the uniqueness will be described. The uniqueness calculating unit 403 calculates the uniqueness indicating the ratio of the number of records in which an attribute value does not match any of the attribute values contained in the other records to the number of records containing the attribute value classified under the attribute. Furthermore, the uniqueness calculating unit 403 calculates the uniqueness for each attribute extracted as the common attribute.

Specifically, the uniqueness calculating unit 403 refers to the uniqueness calculating table 303; identifies, for each attribute, the number of attribute values stored in the uniqueness calculating table 303; and calculates, for example, the sum of the corresponding number of duplications. Furthermore, the uniqueness calculating unit 403 identifies the number of attribute values associated with the number of duplications, i.e., "1". Then, the uniqueness calculating unit 403 calculates the uniqueness by dividing the number of attribute values associated with the number of duplications, i.e., "1" by the number of attribute values.

In the example illustrated in FIG. 7B, the uniqueness calculating unit 403 calculates the uniqueness of each of the attributes "name" and "OS" classified under the type name "server". Because the number of attribute values is "10" for the attribute "name" and the number of attribute values with the number of duplications being "1" is "8", the uniqueness calculating unit 403 calculates the uniqueness "0.8" for the attribute "name". Similarly, the uniqueness calculating unit 403 calculates the uniqueness "0.1" for the attribute "OS".

A case in which the uniqueness calculating unit 403 sets the alternate key will be described below. The uniqueness calculating unit 403 obtains a threshold by referring to the threshold table 304 and identifies the common attribute that satisfies the obtained threshold. Then, the uniqueness calculating unit 403 selects one common attribute that satisfies the threshold and sets it as the alternate key in the threshold table 304. In the following, a case in which the uniqueness calculating unit 403 sets the alternate key will be described by using an example case in which the attribute "name" or "OS" is detected and the uniqueness "0.8" or the uniqueness "0.1" is calculated for each attribute as the common attribute.

The uniqueness calculating unit 403 identifies the common attribute that satisfies the obtained threshold. The uniqueness calculating unit 403 refers to the "threshold of the uniqueness" stored in the threshold table 304 and reads, in the example illustrated in FIG. 8A, the threshold of the uniqueness "0.8" that is associated with the type name "server". Then, the uniqueness calculating unit 403 compares the uniqueness "0.8" or "0.1" of the attribute "name" or "OS" with the threshold of the uniqueness "0.8" and determines whether the attribute "name" or "OS" is equal to or greater than the threshold of the uniqueness "0.8". Specifically, the uniqueness calculating unit 403 identifies whether the uniqueness of the common attribute is greater than a predetermined threshold. Accordingly, for example, the uniqueness calculating unit 403 determines that the attribute "name" satisfies the threshold of the uniqueness or determines that the attribute "OS" does not satisfy the threshold of the uniqueness.

Furthermore, the uniqueness calculating unit 403 refers to the "threshold of the number of data" stored in the threshold table 304 and reads, in the example illustrated in FIG. 8A, the threshold of the uniqueness "10" associated with the type name "server". Furthermore, for the attributes "name" or "OS" detected as the common attribute, the uniqueness calculating unit 403 identifies the number of attribute values by referring to the uniqueness calculating table 303. For example, the uniqueness calculating unit 403 identifies that the number of attribute values is "10" for the attribute "name" and identifies that the number of attribute values is "10" for the attribute "OS". Then, the uniqueness calculating unit 403 determines whether "10" or the number of attribute values "10" for each attribute "name" or "OS" satisfies the threshold of the number of data "10". Then, for example, the uniqueness calculating unit 403 determines that attribute "name" or "OS" satisfies the threshold of the uniqueness.

Specifically, the uniqueness calculating unit 403 identifies the attribute "name" as the common attribute that satisfies both the "threshold of the uniqueness" and the "threshold of the number of data".

The uniqueness calculating unit 403 selects one common attribute that satisfies the threshold. For example, if the uniqueness calculating unit 403 identifies only one common attribute that satisfies the threshold, the uniqueness calculating unit 403 selects the identified one common attribute. Furthermore, for example, if the uniqueness calculating unit 403 identifies a plurality of common attributes that satisfy the threshold, the uniqueness calculating unit 403 selects one of the identified common attributes. For example, the uniqueness calculating unit 403 selects the attribute having the greatest uniqueness.

The uniqueness calculating unit 403 sets the selected common attribute as the alternate key in the threshold table 304. Specifically, the uniqueness calculating unit 403 determines whether the "alternate key" is set in the threshold table 304. If the uniqueness calculating unit 403 determines that the "alternate key" is not set in the threshold table 304, the uniqueness calculating unit 403 sets the selected common attribute as the alternate key in the threshold table 304. For example, as in the example illustrated in FIG. 8B, if the uniqueness calculating unit 403 selects the attribute "name", the uniqueness calculating unit 403 sets, in the threshold table 304, the attribute "name" as the alternate key for the type name "server".

Furthermore, if the uniqueness calculating unit 403 determines that the "alternate key" is set in the threshold table 304, the uniqueness calculating unit 403 updates the threshold table 304 by allowing the selected common attribute to be the alternate key and cancels the merge result obtained using the "alternate key" obtained before the update. For example, the uniqueness calculating unit 403 accesses the sub-MDR information management table 305 and deletes the global ID if it is stored in the "reconciliation candidate". Specifically, the merge result is deleted using the alternate key obtained before the update. Furthermore, for example, the uniqueness calculating unit 403 deletes the information on the sub-MDR stored in the FCMDB data management table 301.

When the uniqueness calculating unit 403 completes the process for setting the alternate key, the uniqueness calculating unit 403 transmits information on completion of the setting process to the merging unit 404.

The merging unit 404 is connected to the FCMDB data management table 301, the threshold table 304, the sub-MDR information management table 305, and the uniqueness calculating unit 403. The merging unit 404 merges the first database with the second database by determining whether the attribute values classified under the common attribute that is extracted by the uniqueness calculating unit 403 match. Furthermore, the merging unit 404 performs the following merging process every time the merging unit 404 receives information on completion of the setting process from the uniqueness calculating unit 403.

Specifically, by using the alternate key stored in the threshold table 304, the merging unit 404 merges the record stored in the database 101 in the sub-MDR with the record stored in the main-MDR. In the example illustrated in FIG. 8B, the merging unit 404 performs the merging using the attribute "name" of the type name "server".

For example, the merging unit 404 selects one record to be processed from the sub-MDR information management table 305, searches the FCMDB data management table 301 for a record having a matching attribute value classified under the alternate key, and determines whether a matching record is present.

If the merging unit 404 determines that a matching record is resent, the merging unit 404 performs the merging on the matching record. Specifically, the merging unit 404 stores, in the "reconciliation candidate" in the sub-MDR information management table 305, the "global ID" that identifies the determined matching record in the FCMDB data management table 301. Furthermore, the merging unit 404 federates the matching record in the FCMDB data management table 301 with the selected record.

A case will be described in which the matching record in the FCMDB data management table 301 is federated with the selected record. The description will be given of a case in which the record containing the name "host-1", the OS "Windows", and the serial number "SN001" stored in the database 101 in the "MDR3" is merged with the record of the global ID "GID1" illustrated in FIG. 5A. As illustrated in FIG. 5B, the merging unit 404 stores, in the FCMDB data management table 301, the MDR identification information "MDR3" in addition to the MDR identification information "MDR1" by associating the MDR identification information "MDR3" with the name "host-1" and the OS "Windows". Furthermore, the merging unit 404 newly stores, in the FCMDB data management table 301, the serial number "SN001" by associating it with the MDR identification information "MDR3".

If the merging unit 404 determines that a matching record is not present, the merging unit 404 completes the process without performing the merging. Furthermore, the merging unit 404 repeats the process until it selects all of the records.

In the following, the merging performed by the merging unit 404 will further be described with reference to FIG. 12. FIG. 12 is a schematic diagram illustrating a merging unit according to the first embodiment. In FIG. 12, an "MDR X" and an "MDR Y" are the main-MDR and an "MDR Z" is the sub-MDR. Here, from among the records from the MDRs illustrated in FIG. 12, the "MDR X" and the "MDR Y" are merged by the registration processing unit 401. Thereafter, if the uniqueness calculating unit 403 extracts the common attribute "name" or "OS", the merging unit 404 merges, by using the common attribute "name" or "OS" as the alternate key, the record in the "MDR Z" with the record in the "MDR X" or the "MDR Y".

It is also possible to implement the merging apparatus 200 by installing the functions of the registration processing unit 401, the data management unit 402, the uniqueness calculating unit 403, and the merging unit 404 in an already-known information processing apparatus, such as a personal computer or a workstation.

Process Performed by the Merging Apparatus

Figure 13:
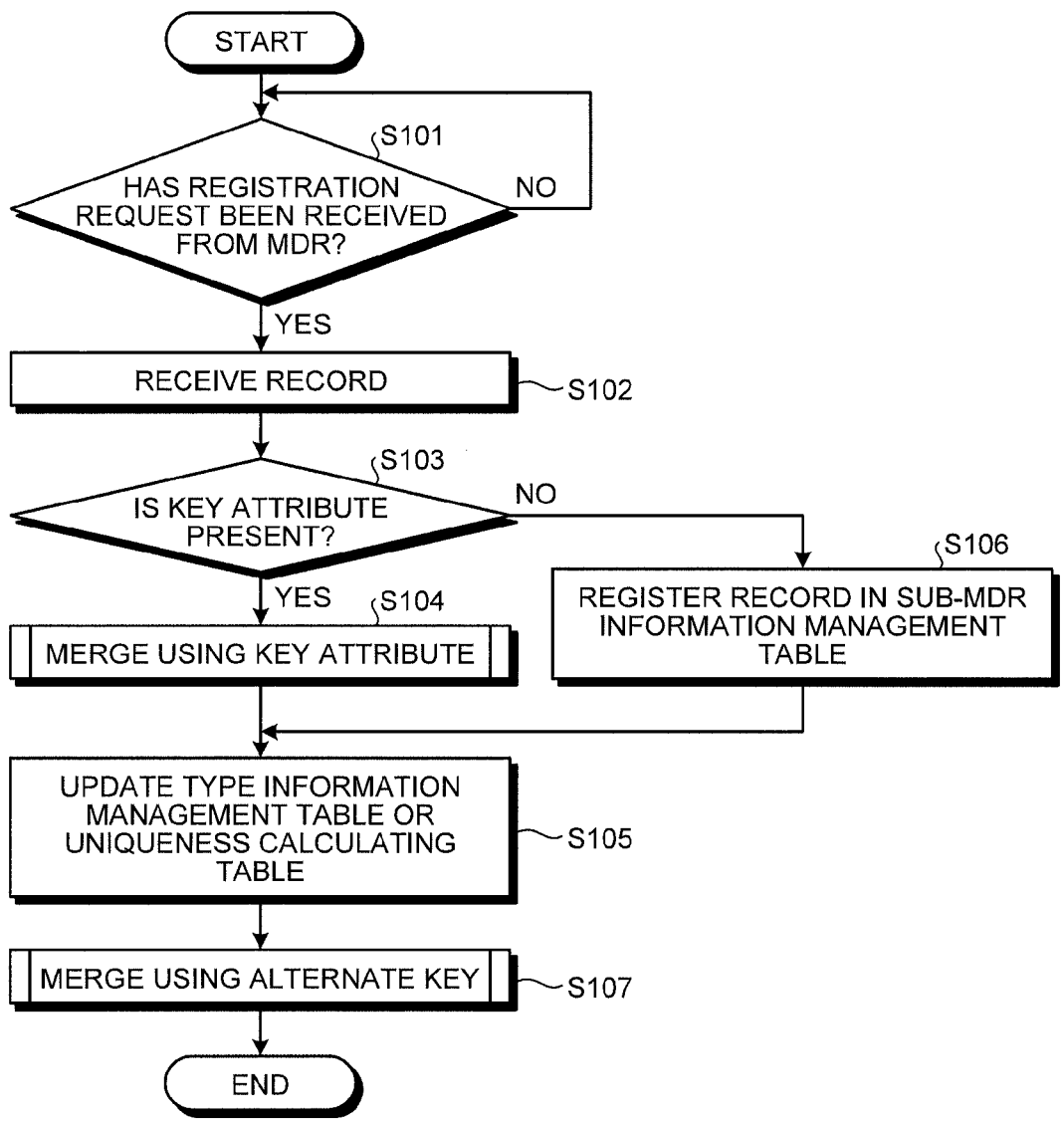
FIG. 13 is a flowchart illustrating the flow of a process performed by the merging apparatus according to the first embodiment.

In the following, the flow of a process performed by the merging apparatus 200 according to the first embodiment will be described. FIG. 13 is a flowchart illustrating the flow of a process performed by the merging apparatus according to the first embodiment.

As illustrated in FIG. 13, in the merging apparatus 200, if the registration processing unit 401 receives a registration request from the MDR 100 (Yes at Step S101), the registration processing unit 401 receives data. Specifically, the registration processing unit 401 receives a record stored in the database 101 in the MDR 100 functioning as the transmission source of the registration request (Step S102).

Then, the registration processing unit 401 determines whether the key attribute is present (Step S103). For example, the registration processing unit 401 determines whether the record contains the attribute value classified under the attribute "IP address". If the registration processing unit 401 determines that the key attribute is present (Yes at Step S103), the registration processing unit 401 performs the merging using the key attribute (Step S104). The flow of the merging process using the key attribute will be described in detail later with reference to FIG. 14; therefore, a description thereof is omitted here.

Thereafter, when the registration processing unit 401 stores the record in the FCMDB data management table 301, the data management unit 402 updates the type information management table 302 or the uniqueness calculating table 303 (Step S105). Specifically, the data management unit 402 updates the information stored in the type information management table 302 and the uniqueness calculating table 303 every time the information stored in the FCMDB data management table 301 changes.

At Step S103, if the registration processing unit 401 determines that the key attribute is not present (No at Step S103), the registration processing unit 401 stores the received record in the sub-MDR information management table 305 (Step S106). Then, the data management unit 402 updates the type information management table 302 or the uniqueness calculating table 303 (Step S105).

Thereafter, if the data management unit 402 updates the type information management table 302 or the uniqueness calculating table 303 (Step S105), the uniqueness calculating unit 403 or the merging unit 404 in the merging apparatus 200 performs the merging using the alternate key (Step S107). The flow of a merging process using the alternate key will be described in detail later with reference to FIG. 15; therefore, a description thereof is omitted here.

Merging Process Using the Key Attribute

Figure 14:
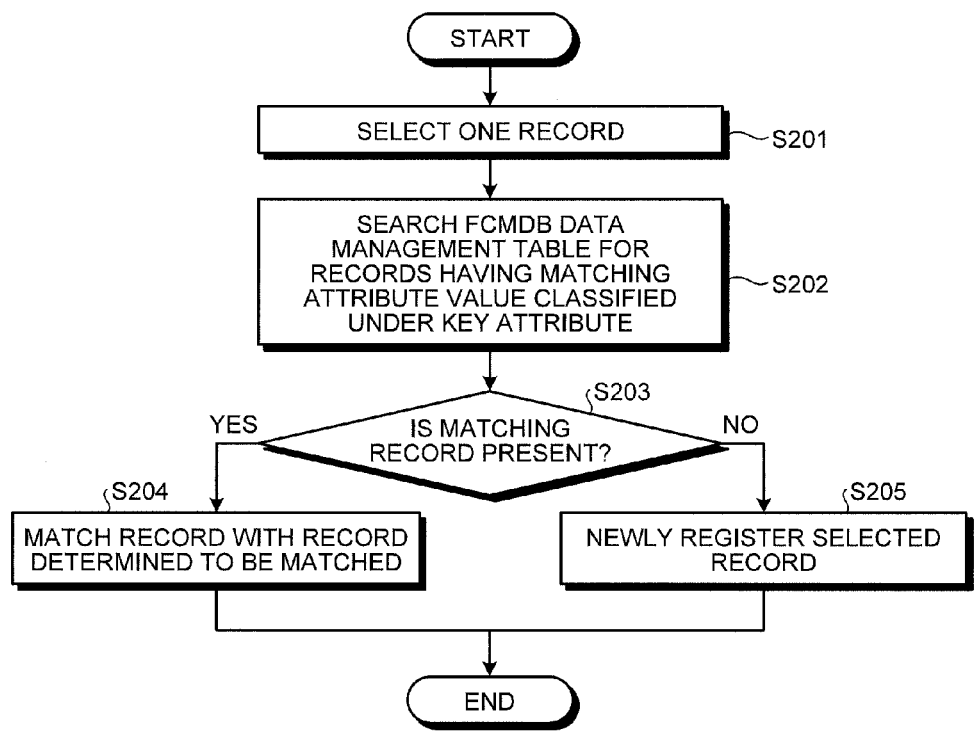
FIG. 14 is a flowchart illustrating the flow of the merging process that uses the key attribute and is performed by the merging apparatus according to the first embodiment.

In the following, the flow of a merging process that uses the key attribute and is performed by the merging apparatus 200 according to the first embodiment will be described. FIG. 14 is a flowchart illustrating the flow of the merging process that uses the key attribute and is performed by the merging apparatus according to the first embodiment. The flow of the process that will be described using FIG. 14 corresponds to Step S104 from among the processes that have been described using FIG. 13.

As illustrated in FIG. 14, when performing the merging using the key attribute, the registration processing unit 401 selects one record to be processed (Step S201). For example, the registration processing unit 401 selects one newly received record. Then, the registration processing unit 401 searches the FCMDB data management table 301 for records having the matching attribute value classified under the key attribute (Step S202).

Then, the registration processing unit 401 determines whether a matching record is present (Step S203). For example, if the attribute value of the attribute "IP address" of the selected record is "192.168.0.1", the registration processing unit 401 determines whether a record containing the IP address "192.168.0.1" is present in the records that have already been stored in the FCMDB data management table 301. If the registration processing unit 401 determines that a matching record is present (Yes at Step S203), the registration processing unit 401 merges the determined matching record with the record determined to be matched (Step S204). Specifically, from among the record that have already been stored in the FCMDB data management table 301, the registration processing unit 401 merges the record containing the IP address "192.168.0.1" with the selected record as the same data.

In contrast, if the registration processing unit 401 determines that no matching record is present (No at Step S203), the registration processing unit 401 newly registers the selected record in the FCMDB data management table 301 (Step S205).

The registration processing unit 401 performs a series of processes on all of the received records.

Merging Process Using the Alternate Key

Figure 15:
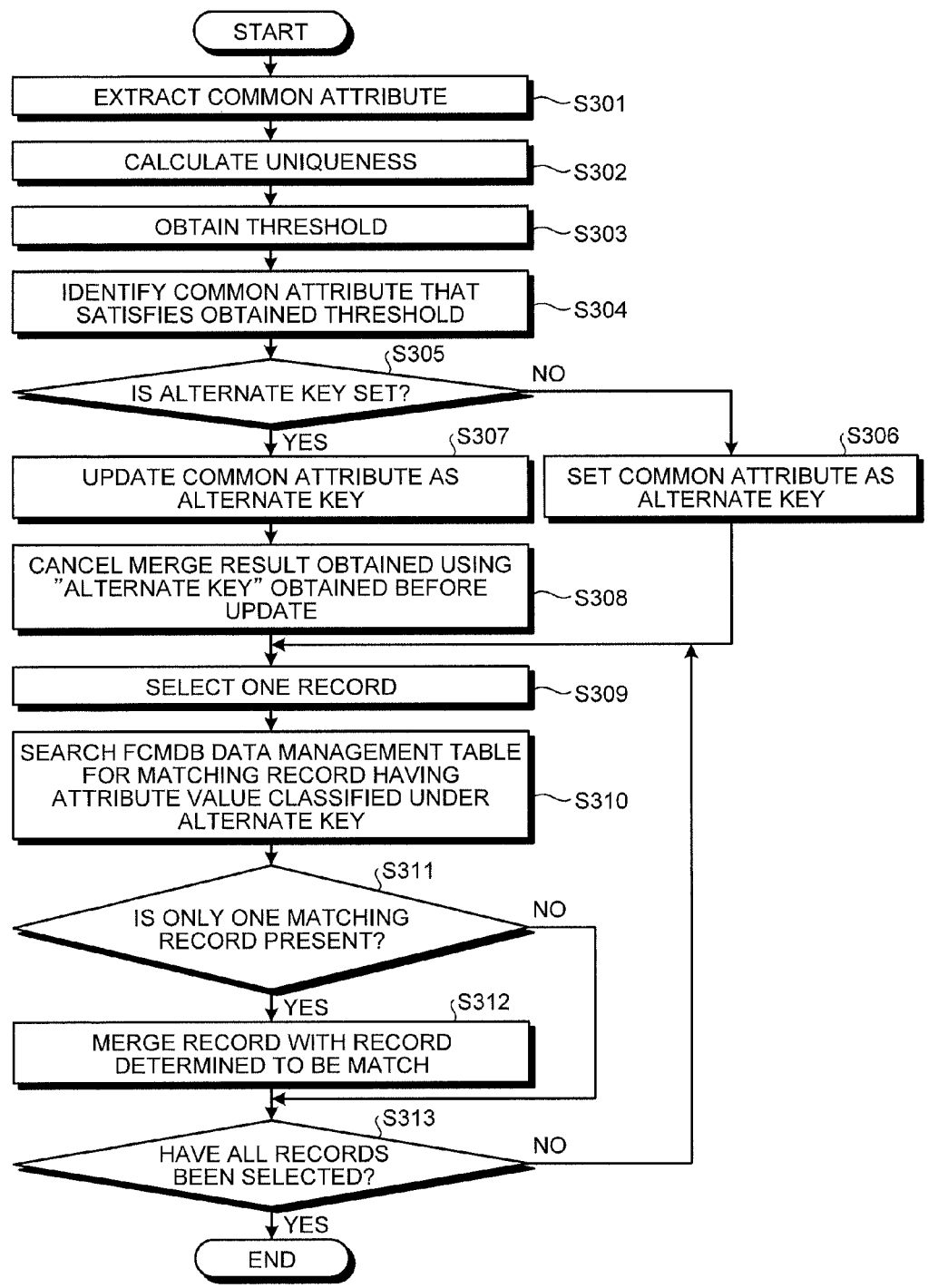
FIG. 15 is a flowchart illustrating the flow of the merging process that uses an alternate key and is performed by the merging apparatus according to the first embodiment.

In the following, the flow of the merging process that uses the alternate key and is performed by the merging apparatus 200 according to the first embodiment will be described. FIG. 15 is a flowchart illustrating the flow of the merging process that uses an alternate key and is performed by the merging apparatus according to the first embodiment. The flow of the process that will be described using FIG. 15 corresponds to Step S107 from among the processes that have been described using FIG. 13.

As illustrated in FIG. 15, if the merging process using the alternate key is performed, the uniqueness calculating unit 403 extracts the common attribute (Step S301). Specifically, the uniqueness calculating unit 403 refers to the type information management table 302 to extract the common attribute. For example, the uniqueness calculating unit 403 extracts, as the common attribute, the attribute "name" or "OS".

Then, the uniqueness calculating unit 403 calculates the uniqueness (Step S302). For example, by referring to the uniqueness calculating table 303, the uniqueness calculating unit 403 calculates the uniqueness "0.8" for the common attribute "name" because the number of attribute values is "10" and the number of attribute values with the number of duplication being "1" is "8".

Then, the uniqueness calculating unit 403 obtains the threshold by referring to the threshold table 304 (Step S303). For example, the uniqueness calculating unit 403 obtains the threshold of the uniqueness "0.8". Then, the uniqueness calculating unit 403 identifies the common attribute that satisfies the obtained threshold and selects one common attribute (Step S304). For example, the uniqueness calculating unit 403 identifies common attribute "name" having the uniqueness "0.8" and selects the common attribute "name".

Then, the uniqueness calculating unit 403 determines whether the alternate key is set in the threshold table 304 (Step S305). If the uniqueness calculating unit 403 determines that the alternate key is not set in the threshold table 304, (No at Step S305), the uniqueness calculating unit 403 sets the selected common attribute as the alternate key (Step S306).

In contrast, if the uniqueness calculating unit 403 determines that the alternate key is set in the threshold table 304 (Yes at Step S305), the uniqueness calculating unit 403 updates the selected common attribute as the alternate key (Step S307) and cancels the merge result obtained using the "alternate key" obtained before the update (Step S308). For example, the uniqueness calculating unit 403 accesses the sub-MDR information management table 305 and deletes the global ID if it is stored in the "reconciliation candidate". Furthermore, the uniqueness calculating unit 403 deletes the information on the sub-MDR stored in the FCMDB data management table 301 because it is the merge result obtained by using the alternate key that has not been updated.

Thereafter, the merging unit 404 selects, from the sub-MDR information management table 305, one record to be processed (Step S309) and searches the FCMDB data management table 301 for the matching record having the attribute value classified under the alternate key (Step S310).

Then, the merging unit 404 determines whether only one matching record is present (Step S311). If the merging unit 404 determines that only one matching record is present (Yes at Step S311), the merging unit 404 merges a record with a record determined to be a match (Step S312). Specifically, the merging unit 404 stores, in the "reconciliation candidate" in the sub-MDR information management table 305, the "global ID" that identifies the determined matching record in the FCMDB data management table 301. Furthermore, for example, the merging unit 404 federates the matching record in the FCMDB data management table 301 with the selected record. In contrast, if the merging unit 404 determines that no matching record is present (No at Step S311), the merging unit 404 does not merge anything.

Then, the merging unit 404 determines whether all of the records are selected (Step S313). If the merging unit 404 determines that all of the records are selected (Yes at Step S313), the merging unit 404 completes the process. In contrast, if the merging unit 404 determines that not all of the records are selected (No at Step S313), the merging unit 404 repeats the processes from Step S309 until the merging unit 404 determines that all of the records are selected.

Process Performed by the Data Management Unit

Figure 16:
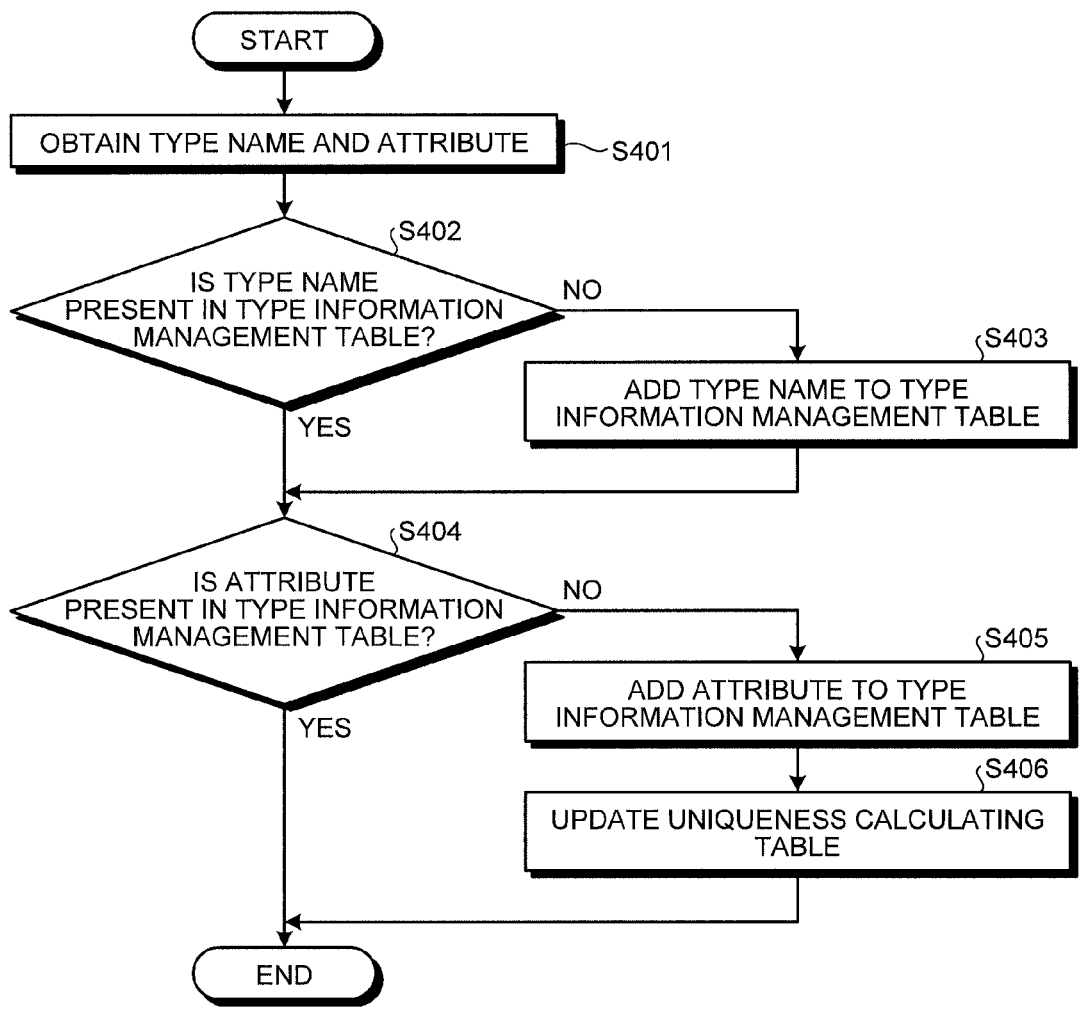
FIG. 16 is a flowchart illustrating the flow of a process performed by a data management unit according to the first embodiment.

In the following, the flow of a process performed by the data management unit 402 according to the first embodiment will be described with reference to FIG. 16. FIG. 16 is a flowchart illustrating the flow of a process performed by a data management unit according to the first embodiment. The flow of the process that will be described using the FIG. 16 corresponds to Step 5105 from among the processes that have been described using FIG. 13.

As illustrated in FIG. 16, the data management unit 402 obtains both the "type name" and the "attribute" for the newly received record (Step S401). For example, the data management unit 402 obtains, from the FCMDB data management table 301 or the sub-MDR information management table 305, the "type name", the "attribute", and the "MDR identification information" or the "sub-MDR identification information" for the newly stored record, which are associated with each other.

Then, the data management unit 402 determines whether the obtained "type name" is present in the type information management table 302 (Step S402). For example, the data management unit 402 determines whether the type information management table 302 stores therein the type name "server". If the data management unit 402 determines that the obtained "type name" is not present (No at Step S402), the data management unit 402 adds the obtained "type name" to the type information management table 302 (Step S403). For example, the data management unit 402 newly stores the "server" in the "type name" in the type information management table 302.

Then, if the data management unit 402 adds the "type name" or if the data management unit 402 determines that the obtained "type name" is present (Yes at Step S402), the data management unit 402 determines whether the obtained "attribute" is present in the type information management table 302 (Step S404). Specifically, the data management unit 402 determines whether the attribute "OS" classified under the type name "server" is stored. If the data management unit 402 determines that the obtained "attribute" is not present (No at Step S404), the data management unit 402 adds the obtained "attribute" to the type information management table 302 (Step S405). For example, the data management unit 402 newly stores the attribute "OS" by associating it with the type name "server" that is stored in the type information management table 302. At this time, the data management unit 402 also stores the "main-MDR identification information" or the "sub-MDR identification information".

Then, the data management unit 402 updates the uniqueness calculating table 303 (Step S406). Specifically, the data management unit 402 stores, in the uniqueness calculating table 303, information on the attribute that is newly stored in the type information management table 302 and then completes the process. At Step 5404, if the data management unit 402 determines that the obtained "attribute" is present (Yes at Step S404), the data management unit 402 ends the process without processing anything.

When obtaining a plurality of type names at Step S401, the data management unit 402 performs the process performed at Steps S402 or S403 on all of the obtained type names. Similarly, if the data management unit 402 obtains a plurality of attributes, the data management unit 402 performs the processes performed at Steps S404 to S406 on all of the obtained attributes.

Advantage of the First Embodiment

As described above, according to the first embodiment, the merging apparatus 200 checks the attribute that is set in the first database against the attribute that is set in the second database and extracts the common attribute that is set, in common, in the first database and the second database. Then, the merging apparatus 200 merges the first database with the second database by determining whether the attribute values classified under the extracted common attribute match. Accordingly, the merging apparatus 200 can easily performs the merging on the database in which the key attribute is not set. Therefore, when, for example, a database in which the key attribute is not set is subjected to the merging, the merging can be easily performed even though the key attribute is neither manually reset nor manually merged.

Furthermore, according to the first embodiment, with the merging apparatus 200, if a plurality of common attributes are extracted by the uniqueness calculating unit 403, the merging is performed using the common attribute having the greatest uniqueness; therefore, precise merging can be performed. Specifically, by determining the common attribute functioning as the alternate key by taking into consideration the uniqueness, it is possible to prevent different records from being erroneously merged as the same records.

Furthermore, according to the first embodiment, the merging apparatus 200 identifies whether the calculated uniqueness of the common attribute is greater than a predetermined threshold and performs the merging by using only the identified common attribute having the ratio greater than the predetermined threshold; therefore, precise merging can be performed. Specifically, by using the uniqueness, it is possible to prevent different records from being erroneously merged as the same records.

[b] Second Embodiment

In the above explanation, it has been mentioned that in the method of the first embodiment all of the merge results on the sub-MDR is cancelled every time the alternate key is updated; however, the present invention is not limited thereto. It is not limited to canceling all of the merge results. For example, if the sub-MDR information management table 305 stores therein the merge result on the merging that is manually performed by an administrator, it is not limited to canceling the merge result on the merging that is manually performed.

Accordingly, in the following, instead of cancelling all of the merge results every time the alternate key is updated, a method of not cancelling, for example, the merge result on the merging that is manually performed by an administrator will be described as a second embodiment. In the following, a description of components that are identical to those of the merging apparatus 200 according to the first embodiment will be omitted.

As illustrated in FIG. 17, in addition to the sub-MDR information management table 305 described with reference to FIGS. 9A and 9B, the sub-MDR information management table 305 according to the second embodiment further stores therein a "fixed flag". FIG. 17 is a schematic diagram illustrating an example of information stored in a sub-MDR information management table according to a second embodiment.

The fixed flag mentioned here is information indicating, when the alternate key is updated, whether the merge result is cancelled. In the example illustrated in FIG. 17, the fixed flag "true" means that the merge result is not cancelled, whereas the fixed flag "false" means that the merge result is cancelled. For example, the fixed flags stored in the sub-MDR information management table 305 are usually "false". If an administrator manually performs the merging, the "fixed flag", which is associated with a record corresponding to the merge result performed by the administrator, is set to be "true" by the data management unit 402 or the administrator.

Figure 18:
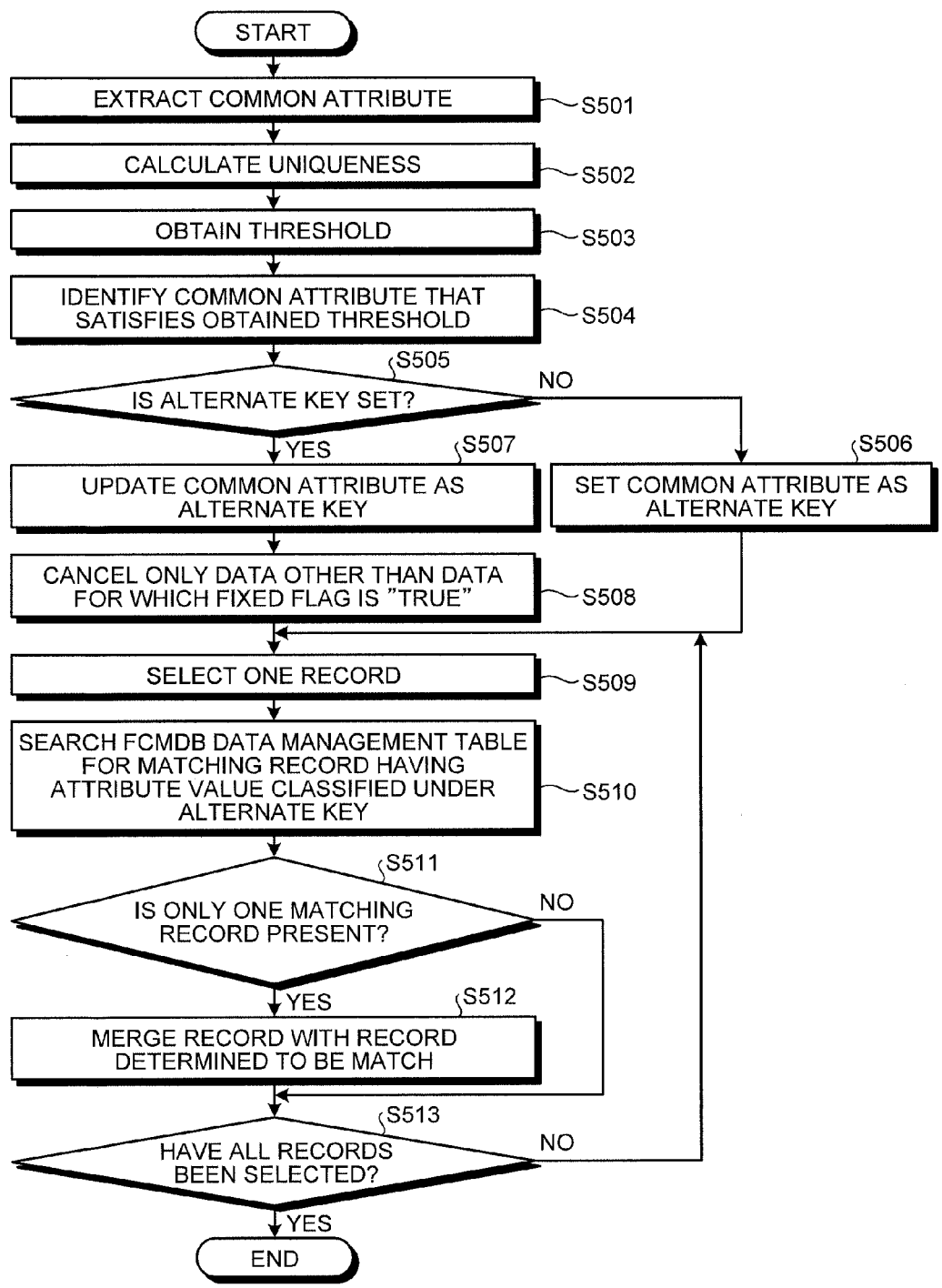
FIG. 18 is a flowchart illustrating the flow of the merging process that uses an alternate key and is performed by a merging apparatus according to the second embodiment.

Then, as illustrated at Steps S507 and S508 in FIG. 18, with the merging apparatus 200 according to the second embodiment, if the uniqueness calculating unit 403 updates the alternate key (Step S507), the merge result is cancelled only for data other than for data for which the fixed flag is "true" (Step S508). Specifically, unlike the first embodiment, instead of uniformly cancelling the merge result, for example, only the merge result on the merging other than that manually performed by an administrator is cancelled. Steps S501 to S507 illustrated in FIG. 18 correspond to Steps S301 to S307 illustrated in FIG. 15. Furthermore, Steps S509 to S513 illustrated in FIG. 18 correspond to Steps S309 to S313 illustrated in FIG. 15.

In the second embodiment described above, a case has been described in which the fixed flag is set to be "true" only when a user manually performs the merging; however the present invention is not limited thereto. For example, after the merging apparatus 200 performs the merging, it is also possible to set the fixed flag "true" for a merge result that is selected by a user.

Advantage of the Second Embodiment

As described above, according to the second embodiment, it is possible to set a record in which the merge result remains the same even when the alternate key is updated; therefore, it is possible to prevent unwanted merging from being performed.

[c] Third Embodiment

The first and second embodiments have been described; however, the present invention is not limited to the embodiments described above and may be implemented with various kinds of embodiments other than the embodiments described above. Accordingly, in the following, another embodiment will be described.

Type Information Management Table and Uniqueness Calculating Table

For example, in the first embodiment, a case has been described in which the type information management table 302 or the uniqueness calculating table 303 is updated by the data management unit 402 every time a new MDR 100 is connected; however, the present invention is not limited thereto. For example, it is also possible for an administrator previously to store information in the type information management table 302 or the uniqueness calculating table 303 and to perform the merging process by using the alternate key.

Uniqueness

Furthermore, in the first embodiment, a case of using the uniqueness has been described; however, the present invention is not limited thereto. For example, instead of using the uniqueness, it is also possible to set the common attribute extracted by the merging apparatus 200 as the alternate key. Similarly, instead of using the threshold stored in the threshold table 304, it is also possible to set the common attribute extracted by the merging apparatus 200 as the alternate key.

System Configuration

Furthermore, the flow of the processes, the control procedures, the specific names, and the information containing various kinds of data or parameters indicated in the above specification and drawings (FIGS. 1 to 18) may be arbitrarily changed unless otherwise noted.

The records of each device illustrated in the drawings are only for conceptually illustrating the functions thereof and are not necessarily physically configured as illustrated in the drawings. In other words, the specific shape of a separate or integrated device is not limited to the drawings; however, all or part of the device may be configured by functionally or physically separating or integrating any of the units depending on various loads or use conditions. For example, in the example illustrated in FIG. 2, with the merging apparatus 200, a part or all of the units in the storing unit 300 may be integrated or separated.

Computer

Figure 19:
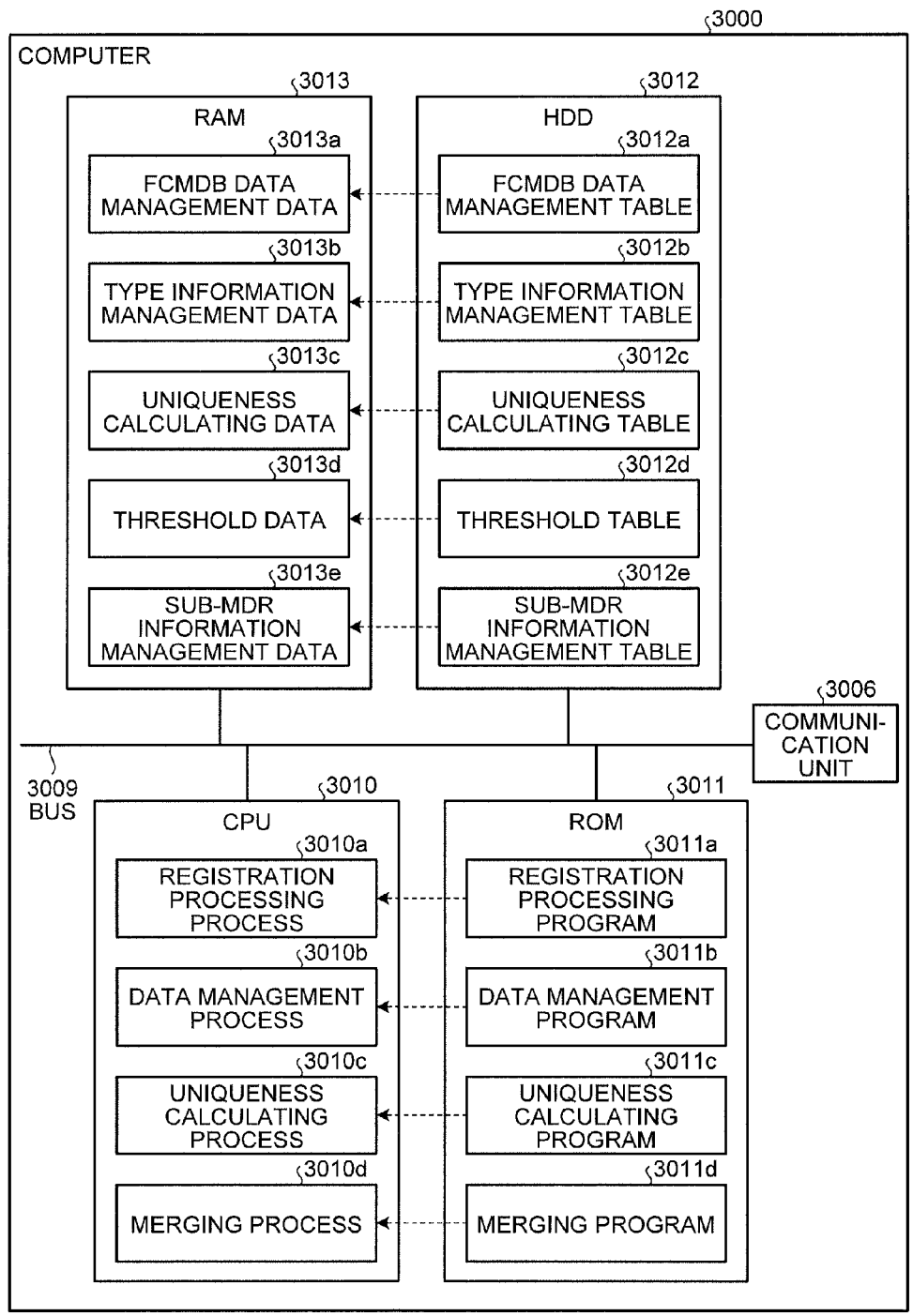
FIG. 19 is a schematic diagram illustrating an example of a computer that executes a merging program according to the first embodiment.

The various processes described in the above embodiments may be implemented by programs prepared in advance and executed by a computer such as a personal computer or a workstation. Accordingly, in the following, a computer that executes a merging program having the same function performed by the apparatus in the above embodiments will be described as an example using FIG. 19. FIG. 19 is a schematic diagram illustrating an example of a computer that executes a merging program according to the first embodiment.

As illustrated in FIG. 19, a computer 3000 according to the first embodiment includes a communication unit 3006, a CPU 3010, a ROM 3011, an HDD 3012, and a RAM 3013, which are connected via a bus 3009 or the like.

As illustrated in FIG. 19, the ROM 3011 stores therein, in advance, a control program, i.e., a registration processing program 3011a, a data management program 3011b, a uniqueness calculating program 3011c, and a merging program 3011d exhibiting the same function as the registration processing unit 401, the data management unit 402, the uniqueness calculating unit 403, and the merging unit 404 described in the first embodiment. These programs 3011a to 3011d may appropriately be integrated or separated in the same manner as the components of the merging apparatus 200 illustrated in FIG. 2.

As illustrated in FIG. 19, because the CPU 3010 reads these programs 3011a to 3011d from the ROM 3011 and executes them, these programs 3011a to 3011d function as a registration processing process 3010a, a data management process 3010b, a uniqueness calculating process 3010c, and a merging process 3010d. The processes 3010a to 3010d correspond to, respectively, the registration processing unit 401, the data management unit 402, the uniqueness calculating unit 403, and the merging unit 404 illustrated in FIG. 2.

The HDD 3012 stores therein an FCMDB data management table 3012a, a type information management table 3012b, a uniqueness calculating table 3012c, a threshold table 3012d, and a sub-MDR information management table 3012e. The tables 3012a to 3012e correspond to, respectively, the FCMDB data management table 301, the type information management table 302, the uniqueness calculating table 303, the threshold table 304, and the sub-MDR information management table 305 illustrated in FIG. 2.

The CPU 3010 reads the FCMDB data management table 3012a, the type information management table 3012b, the uniqueness calculating table 3012c, the threshold table 3012d, and the sub-MDR information management table 3012e and stores them in the RAM 3013 and executes the merging program by using an FCMDB data management data 3013a, a type information management data 3013b, a uniqueness calculating data 3013c, a threshold data 3013d, and a sub-MDR information management data 3013e that are stored in the RAM 3013.

Additional

The merging program according to the embodiments may be distributed via a network, such as the Internet. Furthermore, the merging program may be stored in a computer-readable recording medium, such as a hard disk, a flexible disk (FD), a compact disk read only memory (CD-ROM), a magneto-optical (MO) disk, and a digital versatile disk (DVD). The computer then reads and executes the program from the recording medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A merging apparatus comprising:
a memory; and
a processor coupled to the memory, wherein the memory includes
a first database that store therein, as records, each of attribute values that is classified under one or a plurality of attributes and that is associated with each other, in which a plurality of attributes including a key attribute that is set in advance as a key for merging is set;
a second database that store therein, as records, each of the attribute values, in which one or a plurality of attributes excluding the key attribute is set; and
the processor is configured to execute a process comprising checking the attribute that is set in the first database against the attribute that is set in the second database and extracting a common attribute that is set, in common, in both the first database and the second database; and
merging the first database with the second database by determining whether attribute values classified under the common attribute that is extracted in the extracting match, wherein
the merging, when a plurality of common attributes are extracted, merges the first database with the second database by using a common attribute which is selected from the plurality of common attributes, the common attribute is selected based on first record numbers and second record numbers, each of the first record numbers corresponding to one of the plurality of attributes stored in the first database and being the number of records in which an attribute value classified under the one of the plurality of attributes does not match any of the attribute values contained in the other records and classified under the one of the plurality of attributes, each of the second record numbers corresponding to one of the plurality of attributes stored in the first database and being the number of records containing the attribute value classified under the one of the plurality of attributes.

2. The merging apparatus according to claim 1, wherein the process further comprising calculating, for each attribute that is set in the first database, the ratio of the number of records in which an attribute value classified under the attribute does not match any of the attribute values contained in the other records to the number of records containing the attribute value classified under the attribute, wherein
when a plurality of common attributes is extracted in the extracting, the merging identifies, from among the extracted common attributes, a common attribute having the highest ratio calculated in the calculating and performs merging by determining whether attribute values classified under the identified common attribute match.

3. The merging apparatus according to claim 2, wherein the merging identifies, for the common attribute, whether the ratio calculated in the calculating is greater than a predetermined threshold and performs the merging using only the identified common attribute having the ratio greater than the predetermined threshold.

4. A merging method comprising:
checking an attribute that is set in a first database storing therein, as records, each of attribute values that is classified under one or a plurality of attributes and is associated with each other, in which a plurality of attributes including a key attribute that is set in advance as a key for merging against an attribute that is set in a second database storing therein, as records, each of the attribute values, in which one or a plurality of attributes excluding the key attribute is set and extracting a common attribute that is set, in common, in the first database and the second database; and merging the first database with the second database by determining whether attribute values classified under the common attribute that is extracted at the extracting match, wherein the merging, when a plurality of common attributes are extracted, merges the first database with the second database by using a common attribute which is selected from the plurality of common attributes, the common attribute is selected based on first record numbers and second record numbers, each of the first record numbers corresponding to one of the plurality of attributes stored in the first database and being the number of records in which an attribute value classified under the one of the plurality of attributes does not match any of the attribute values contained in the other records and classified under the one of the plurality of attributes, each of the second record numbers corresponding to one of the plurality of attributes stored in the first database and being the number of records containing the attribute value classified under the one of the plurality of attributes.

5. A computer-readable, non-transitory medium having stored therein a merging program that causes a computer to execute a process, the process comprising:

checking an attribute that is set in a first database storing therein, as records, each of attribute values that is classified under one or a plurality of attributes and is associated with each other, in which a plurality of attributes including a key attribute that is set in advance as a key for merging against an attribute that is set in a second database storing therein, as records, each of the attribute values, in which one or a plurality of attributes excluding the key attribute is set and extracting a common attribute that is set, in common, in the first database and the second database; and merging the first database with the second database by determining whether attribute values classified under the common attribute that is extracted at the extracting match, wherein the merging, when a plurality of common attributes are extracted, merges the first database with the second database by using a common attribute which is selected from the plurality of common attributes, the common attribute is selected based on first record numbers and second record numbers, each of the first record numbers corresponding to one of the plurality of attributes stored in the first database and being the number of records in which an attribute value classified under the one of the plurality of attributes does not match any of the attribute values contained in the other records and classified under the one of the plurality of attributes, each of the second record numbers corresponding to one of the plurality of attributes stored in the first database and being the number of records containing the attribute value classified under the one of the plurality of attributes.

* * * * *